US012644982B2

(12) United States Patent
Lunn et al.

(10) Patent No.: US 12,644,982 B2
(45) Date of Patent: Jun. 2, 2026

(54) AUTOMOTIVE SENSOR FUSION OF RADAR, LIDAR, CAMERA SYSTEMS WITH IMPROVED SAFETY BY USE OF MACHINE LEARNING

(71) Applicant: PROVIZIO LIMITED, Limerick (IE)

(72) Inventors: Barry Lunn, Bruff (IE); Denver Humphrey, Ballymena (GB); Peter Ludlow, Lisburn (GB); Steven Christie, Drumbo (GB); Scott Thayer, Pittsburgh, PA (US)

(73) Assignee: PROVIZIO LIMITED, Limerick (IE)

( * ) Notice: Subject to any disclaimer, the term of this patent is extended or adjusted under 35 U.S.C. 154(b) by 75 days.

(21) Appl. No.: 18/685,846

(22) PCT Filed: Aug. 22, 2022

(86) PCT No.: PCT/EP2022/073431
§ 371 (c)(1),
(2) Date: Feb. 22, 2024

(87) PCT Pub. No.: WO2023/025777
PCT Pub. Date: Mar. 2, 2023

(65) Prior Publication Data
US 2024/0385315 A1 Nov. 21, 2024

(30) Foreign Application Priority Data
Aug. 24, 2021 (EP) ..................................... 21192777

(51) Int. Cl.
*G01S 19/42* (2010.01)
*G01S 7/35* (2006.01)
(Continued)

(52) U.S. Cl.
CPC ............ *G01S 13/931* (2013.01); *G01S 7/356* (2021.05); *G01S 7/417* (2013.01); *G01S 13/343* (2013.01);
(Continued)

(58) Field of Classification Search
CPC ........ G01S 13/931; G01S 7/356; G01S 7/417; G01S 13/343; G01S 13/865;
(Continued)

(56) References Cited

U.S. PATENT DOCUMENTS

2017/0254895 A1* 9/2017 Tong ..................... G01S 13/867
2018/0372875 A1* 12/2018 Juelsgaard .............. G01S 17/42
(Continued)

OTHER PUBLICATIONS

PCT/EP2022/073431. International Search Report. (Feb. 2, 2023).

*Primary Examiner* — Sisay Yacob
(74) *Attorney, Agent, or Firm* — Anthony Smyth; LOZA & LOZA, LLP

(57) ABSTRACT

The present invention provides a vehicle safety sensor system comprising a processor; a first radar sensor configuration to scan a first wide area; a first auxiliary sensor configuration to scan a second wide area; a second radar sensor configuration to scan a first narrow area, wherein the first narrow area is smaller than the first wide area; and a second auxiliary sensor configuration to scan a second narrow area, wherein the second narrow area is smaller than the second wide area. The system is configured to operate in a first mode wherein data from the first radar sensor configuration and data from the first auxiliary sensor configuration is fused together to provide a first set of fused data; and the processor is configured to detect objects from the first set of fused data. The system is configured to operate in a second mode when an object has been detected wherein data from the second radar sensor configuration and data from second auxiliary sensor configuration is fused together
(Continued)

to provide a second set of fused data; and the processor is configured to monitor the detected objects based on the second set of fused data.

18 Claims, 20 Drawing Sheets

(51) Int. Cl.

| | |
|---|---|
| *G01S 7/41* | *(2006.01)* |
| *G01S 13/34* | *(2006.01)* |
| *G01S 13/86* | *(2006.01)* |
| *G01S 13/87* | *(2006.01)* |
| *G01S 13/931* | *(2020.01)* |
| *G01S 19/02* | *(2010.01)* |
| *G01S 19/14* | *(2010.01)* |
| *G01S 7/497* | *(2006.01)* |

(52) U.S. Cl.
CPC .......... *G01S 13/865* (2013.01); *G01S 13/867* (2013.01); *G01S 13/872* (2013.01); *G01S*

*2007/4975* (2013.01); *G01S 2013/932* (2020.01); *G01S 2013/9325* (2013.01)

(58) Field of Classification Search
CPC ................. G01S 13/867; G01S 13/872; G01S 2013/932; G01S 2007/4975; G01S 2013/9325; G01S 17/931; G01S 7/41; G01S 13/86; G01S 13/87
See application file for complete search history.

(56) References Cited

U.S. PATENT DOCUMENTS

| | | | |
|---|---|---|---|
| 2020/0174113 A1 | 6/2020 | Lee et al. | |
| 2021/0101620 A1 | 4/2021 | Buerkle et al. | |
| 2021/0229681 A1 | 7/2021 | Adam et al. | |
| 2022/0214444 A1* | 7/2022 | Das | G01S 17/50 |

* cited by examiner

AUTOMOTIVE SENSOR FUSION OF RADAR, LIDAR, CAMERA SYSTEMS WITH IMPROVED SAFETY BY USE OF MACHINE LEARNING

FIELD OF THE INVENTION

The present disclosure relates to methods and systems for autonomous and ADAS (Advanced Driver-Assistance Systems) for vehicles.

BACKGROUND TO THE INVENTION

On average road accidents kill 1.35 million people every year and injure over 50 million more. Over 90% of motor vehicle accidents are caused by one or more of: a lack of foresight, poor visibility, driver inattention, distractions from inside the vehicle, distractions that are external to the car, and inadequate surveillance. According to the 2008 National Motor Vehicle Crash Causation Survey from the National Highway Traffic Safety Administration (NHTSA), over 90% of motor vehicle accidents fall into one of five categories, namely:

Collision with a second vehicle or pedestrian/cyclist when a user's vehicle is turning or crossing at an intersection;

Collision with static objects at the roadside or with another vehicle when the user's vehicle leaves its lane or leaves the road;

Collision with another vehicle stopped in the lane of the user's vehicle;

Collision with another vehicle travelling in the opposite direction in the lane of the user's vehicle; and The user's vehicle travelling too fast and the user losing control.

Each of these accidents can be avoided. For example:

The risk of accidents at intersections can be mitigated by improved surveillance of intersections, particularly at uncontrolled intersections.

The risk of accidents caused by a user's vehicle leaving its lane or the road can be mitigated by improved attention to the vehicle's position on the road and improved surveillance of driver blind spots as the vehicle changes lane.

The risk of accidents caused by collision with a stationary vehicle can be mitigated by early detection of the vehicle in the path of the user's vehicle and improving reaction times in these scenarios. For example, if traffic unexpectedly stops on a high-speed road, early detection could avoid direct impacts at motorway speeds.

The risk of accidents caused by another vehicle heading towards the user's vehicle can be mitigated by detecting these vehicles, particularly small ones such as motorcycles, approaching from a greater distance.

The risk of a user losing control over their vehicle through excessive speed can be mitigated by improved warning of situations in which the host vehicle is travelling too fast relative to the speed limit for the road and the situation. For example, in a situation where the user's vehicle is making a turn and there is a distance between the user's vehicle and another vehicle in front of it, an excessive speed warning should be based on this distance as well as the speed limit.

The risk of accidents is increased by poor weather conditions. Adverse weather can reduce the ability of drivers to perceive the road around them. Adverse weather can also reduce the degree to which a user can control their vehicle. Further analysis of driving in adverse weather conditions has shown that:

47% of weather-related vehicle crashes happen during rainfall;

24% of weather-related vehicle crashes occur on snowy or icy roads;

15% of weather-related vehicle crashes occur during snowfall or sleet; and

10% of weather-related vehicle crashes occur when visibility is reduced by fog, dust, smoke and heavy precipitation.

To mitigate the risk of an accident, a variety of sensors have been employed on vehicles. By combining sensory data or data derived from disparate sources, the resulting information has less uncertainty than would be possible when these sources were used individually. Combining sensors in this manner is referred to as sensor fusion. Current sensors typically employed in autonomous systems or advanced driver-assistance systems (ADAS) in vehicles typically include one or more of: radar, LIDAR, and Stereo Cameras (or a camera array).

An automotive radar radiates a millimetre wave electromagnetic signal and determines information about an object based signal's reflection. Preferably, the signal is modulated so that it has particular characteristics. The frequency or phase or the frequency and phase of the reflected signal can be analysed upon reception, and for example, the radial range or velocity and angle of the object may be determined.

A lidar transmits a near-infrared electromagnetic signal and the time taken between transmission of the signal and reception of the reflection of the signal determines information about the position of an object.

Stereo cameras (or a camera array) use two or more cameras. At least two of the cameras are positioned a distance apart. This allows a 3D image to be obtained by comparing the different images in a method similar to that when images are received into two eyes.

FIG. 1 shows three spider plots for the sensors described above. Each type of sensor has their intrinsic advantages and disadvantages, which are given indicative scores from 0 (of no value) to 5 (excellent), shown in FIG. 1.

As different sensors have different strengths, it has resulted in many different types of sensors being employed for typical 360-degree coverage around a vehicle. Typically, these sensors are operated independently. As a result, a large, almost 'super-computer' type, processing unit is required within the vehicle to make sense of the information being provided by each of the different sensors. For example, FIG. 2 shows a system where a processor is processing the information from ten different sensors. It should be noted that the processor has to control and process the readings from all the sensors simultaneously because the system does not know where the next threat will come from. However, this results in sensor redundancy in certain situations—i.e. where a sensor is being used when it is not needed. Sensor redundancy is caused, by way of example, by both LIDAR and radar being used in foggy conditions. In these conditions, the LIDAR data has been proven to be of little value. As such the use of LIDAR simply consumes processing power of the processor without any benefit. Similarly, using both LIDAR and cameras in dark conditions causes sensor redundancy because cameras which rely on ambient light may be of little value in the dark.

With reference again to FIG. 2, typical prior art systems have a number of problems. For example:

1. Excessive amounts of raw data from the various sensors is processed centrally. This requires high bandwidth routing through the vehicle and a large amount of central storage.

2. Due to the amount of raw data to be processed, the central processor must be capable of performing a very large number of operations per second to enable low latency target classification and semantic segmentation of the scene.

3. As the system determines accident threats based on the data provided by the sensors, each sensor must independently detect and report objects back to the central processor—thereby requiring the central processor to determine which of the objects pose a risk of an accident. However, some of this results in object detections being replicated by all of the sensors and in all situations—some objects are less critical in terms of accident prevention (such as buildings etc. at the side of the road), but all need to be processed, thus wasting valuable computing power.

4. Power consumption is very high, given the number of sensors typically used and the very high-performance central processor required.

5. Each sensor is trained independently of the other sensors, which extends the amount of time and data—required to train the system.

Known prior art attempts to address at least some of these problems is to simply use a more powerful processor. However, the complexity of such systems leads to increased costs and power consumption, making active protection systems unaffordable for most drivers.

Nevertheless, multi-sensor systems using sensor fusion have been widely adopted and are considered state-of-the-art for four dimensional (4D) sensor technology. 4D sensor technology is suitable for determining:

1. Range (also called distance) to an object.

2. Azimuth angle—the horizontal angular position of the object relative to a line running normal to the front face of the sensor.

3. Elevation angle—the vertical angular position of the object relative to the to a line running normal to the front face of the sensor.

4. Velocity of the object relative to the sensor.

Various techniques have therefore been developed to perform this fusing of information from the different sensors which are detecting the same object. As discussed in the paper entitled "Sensor Data Fusion Through a Distributed Blackboard," by S. Y. Harmon, et al, these techniques can be divided into three categories:

Averaging—where confidence measures are used to weight various estimates of the same property to compute an average value that may not be exactly equivalent to any individual estimate.

Deciding—when one estimate is picked from many others to represent the entire data set.

Guiding—when one estimate is used to direct the acquisition of further estimates.

In this way, decisions can be made to alleviate some of the inherent problems that exist in systems using sensor fusion. These principles can be applied and adapted to different types of sensor fusion. A recent field of development has been in the fusion of sensor readings at the sensor-level and the present disclosure is directed towards improvements in this field. In particular, the present disclosure is directed towards providing systems and methods that incorporate machine learning to identify specific user-case scenarios. Further improvements have been obtained by employing both the 'deciding' and 'guiding' techniques to further decrease sensor detection times and thereby improve road safety.

OBJECT OF THE INVENTION

The present application is directed towards systems and methods for autonomous systems and ADAS (Advanced Driver-Assistance Systems) for vehicles which are advantageous over prior art systems and methods through:

1) Reducing the amount of CPU processing required for an accurate object detection, resulting in a lower latency detection and improved response time;

2) Decreasing power consumption and thereby increasing the range of electric vehicles;

3) Reducing overall sensor size or number of overall sensors required;

4) Reducing the amounts of data being routed by sensors to a processing unit resulting in reduced 'congestion' on the interconnects; or 5) Reducing capacity on the required interconnects, resulting in a reduced assembly cost.

SUMMARY OF THE INVENTION

The present disclosure is directed towards a vehicle safety sensor system. The vehicle safety sensor system comprises: a processor; a first radar sensor configuration to scan a first wide area; a first auxiliary sensor configuration to scan a second wide area; a second radar sensor configuration to scan or process a first narrow area, wherein the first narrow area is smaller than the first wide area; and a second auxiliary sensor configuration to scan or process a second narrow area, wherein the second narrow area is smaller than the second wide area, wherein: the system is configured to operate in a first mode wherein: the data from the first radar sensor configuration and the data from the first auxiliary sensor configuration is fused together to provide a first set of fused data; and the processor is configured to detect objects from the first set of fused data; and the system is configured to operate in a second mode when an object has been detected in the first mode wherein: the data from the second radar sensor configuration and the data from second auxiliary sensor configuration is fused together to provide a second set of fused data; and the processor is configured to monitor the detected objects based on the second set of fused data; wherein the processor is further configured to determine a risk of collision with the detected object based on the second set of fused data, wherein determining the risk of collision comprises selecting a classification for the object from a plurality of classifications.

The first wide area can overlap with, or match, the second wide area. Alternatively, or in addition, the first narrow area can overlap with, or match, the second narrow area. The first narrow area may be a sub-area of or may overlap with the first wide area. The second narrow area may be a sub-area of or may overlap with the second wide area.

Preferably, the first auxiliary sensor configuration comprises an array of a plurality of optical sensors and the optical sensors detect visible spectrum electromagnetic radiation; and the second auxiliary sensor configuration comprises an array of a plurality of optical sensors and the optical sensors detect visible spectrum electromagnetic radiation.

Preferably, the system comprises a LIDAR sensor.

Preferably, the system is coupled to a global satellite navigation system antenna (GNSS).

Preferably, at least one sensor is coupled to a GNSS antenna and data provided by the at least one sensor comprises a timestamp derived from a received GNSS signal.

Preferably, the processor is coupled to a GNSS antenna and positional data in a GNSS signal received by the GNSS antenna is used to control at least one sensor.

Preferably, the processor is coupled to one or more environmental sensors, wherein environmental data provided by the one or more environmental sensors is used to determine a confidence weighting for at least one sensor, wherein the confidence weighting is indicative of the accuracy of the sensor in a detected environmental condition.

Preferably, the environmental sensor is one or more of: a light sensor or a precipitation sensor.

Preferably, the processor is further coupled to one or more of: a compass, a wheel odometer, or a gyroscope.

Preferably, the second auxiliary sensor configuration comprises at least one sensor operating at a higher resolution than the sensors of the first auxiliary sensor configuration; and the second auxiliary sensor configuration is configured to process a narrow area containing the detected object, wherein the narrow area scanned by the second auxiliary sensor configuration is smaller than the area scanned by the first auxiliary sensor configuration.

Preferably, the first radar configuration is a radar operating in a first mode and the second radar configuration is the radar operating in a second mode.

Preferably, the first auxiliary sensor configuration is an array of optical sensors operating in a first mode and the second auxiliary sensor configuration is the array of optical sensors operating in a second mode.

Preferably, the processor is configured to determine a risk of collision based on the data from the sensors, wherein determining the risk of collision comprises selecting a classification for the object from a plurality of classifications.

Preferably, selecting a classification comprises extracting the classification from a look up table using a calculated size of the object.

Preferably, selecting a classification comprises the use of a neural network.

Preferably, selecting a classification comprises the use of a random decision forest.

In one embodiment of the invention, the wide area comprises an angular region in excess of 120 degrees.

In one embodiment of the invention, the narrow area comprises an angular region less than 20 degrees around the object.

The method is also directed towards a method for improving safety of a vehicle. The method comprises: in a first mode: scanning a first wide area with a first radar sensor configuration; scanning a second wide area with a first auxiliary sensor configuration; fusing data from the first radar sensor configuration with the data from the first auxiliary sensor configuration to provide a first set of fused data; determining if an object is present based on the first set of data; and if it is determined than an object is present in the first mode, switching to a second mode; and in the second mode: processing a first narrow area with a second radar sensor configuration, wherein the first narrow area is smaller than the first wide area; processing a second narrow area with a second auxiliary sensor configuration, wherein the second narrow area is smaller than the second wide area; fusing the data from the second radar sensor configuration and the data from second auxiliary sensor configuration to provide a second set of fused data; and monitoring the detected object from the second set of fused data; wherein monitoring comprises determining a risk classification, where the risk classification is indicative of the risk of collision with the detected object.

The first wide area can overlap with, or match, the second wide area. Alternatively, or in addition, the first narrow area can overlap with, or match, the second narrow area. The first narrow area may be a sub-area of or may overlap with the first wide area. The second narrow area may be a sub-area of or may overlap with the second wide area.

Preferably, monitoring comprises determining a risk classification, wherein the risk classification is indicative of the risk of collision with the detected object; and if the risk classification meets a predetermined criterion, switching to a third mode wherein a vehicle safety sensor system controls the vehicle to avoid the detected object.

The present disclosure is also directed towards a computer readable storage medium comprising instructions, which when executed by a processor coupled to a radar and an auxiliary sensor configuration, causes the processor to perform a method in accordance with the present disclosure.

The present disclosure is also directed towards a vehicle safety sensor system comprising: a processor; a first radar sensor configuration to scan a first wide area; a first auxiliary sensor configuration to scan a second wide area; a second radar sensor configuration to scan or process a first narrow area, wherein the first narrow area is smaller than the first wide area; and a second auxiliary sensor configuration to scan or process a second narrow area, wherein the second narrow area is smaller than the second wide area, wherein: the system is configured to operate in a first mode wherein: the data from the first radar sensor configuration and the data from the first auxiliary sensor configuration is fused together to provide a first set of fused data; and the processor is configured to detect objects from the first set of fused data; and the system is configured to operate in a second mode when an object has been detected wherein: the data from the second radar sensor configuration and the data from second auxiliary sensor configuration is fused together to provide a second set of fused data; and the processor is configured to monitor the detected objects based on the second set of fused data.

The method is also directed towards a method comprising: in a first mode: scanning a first wide area with a first radar sensor configuration; scanning a second wide area with a first auxiliary sensor configuration; fusing data from the first radar sensor configuration with the data from the first auxiliary sensor configuration to provide a first set of fused data; determining if an object is present based on the first set of data; and if it is determined than an object is present, switching to a second mode; and in the second mode: processing a first narrow area with a second radar sensor configuration, wherein the first narrow area is smaller than the first wide area; processing a second narrow area with a second auxiliary sensor configuration, wherein the second narrow area is smaller than the second wide area; fusing the data from the second radar sensor configuration and the data from second auxiliary sensor configuration to provide a second set of fused data; and monitoring the detected object from the second set of fused data.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
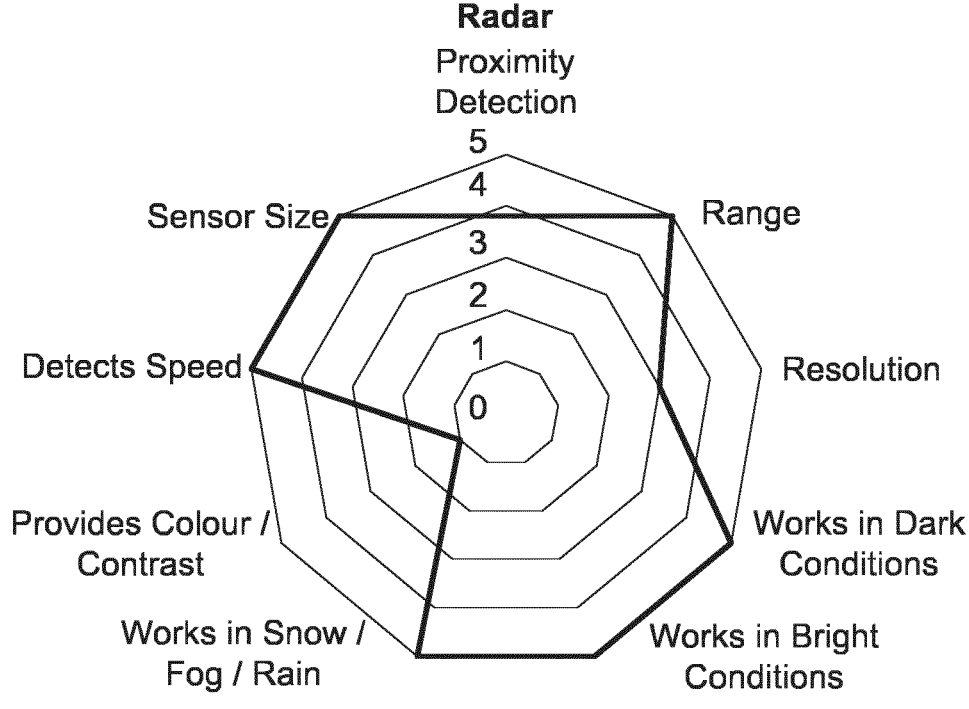
FIG. 1 is a spider plot of the relative strengths of a number of different types of sensors.
Figure 1:
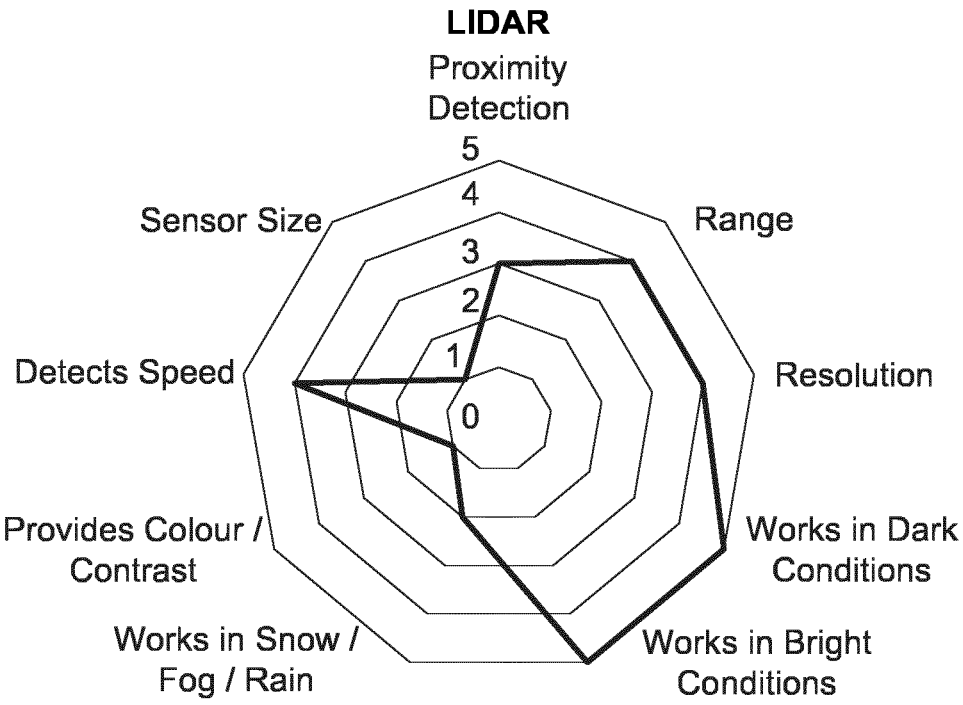
Figure 1:
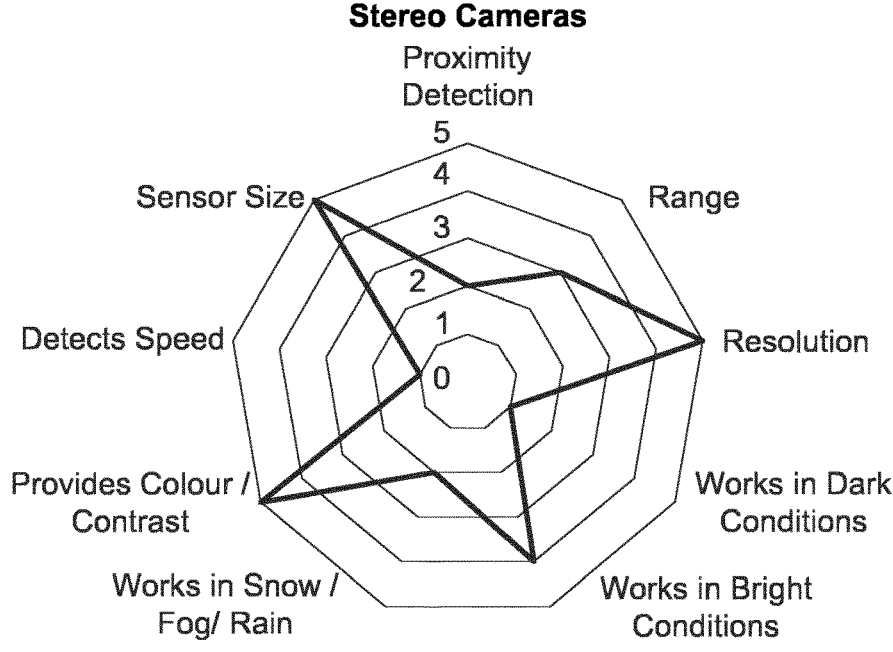
Figure 2:
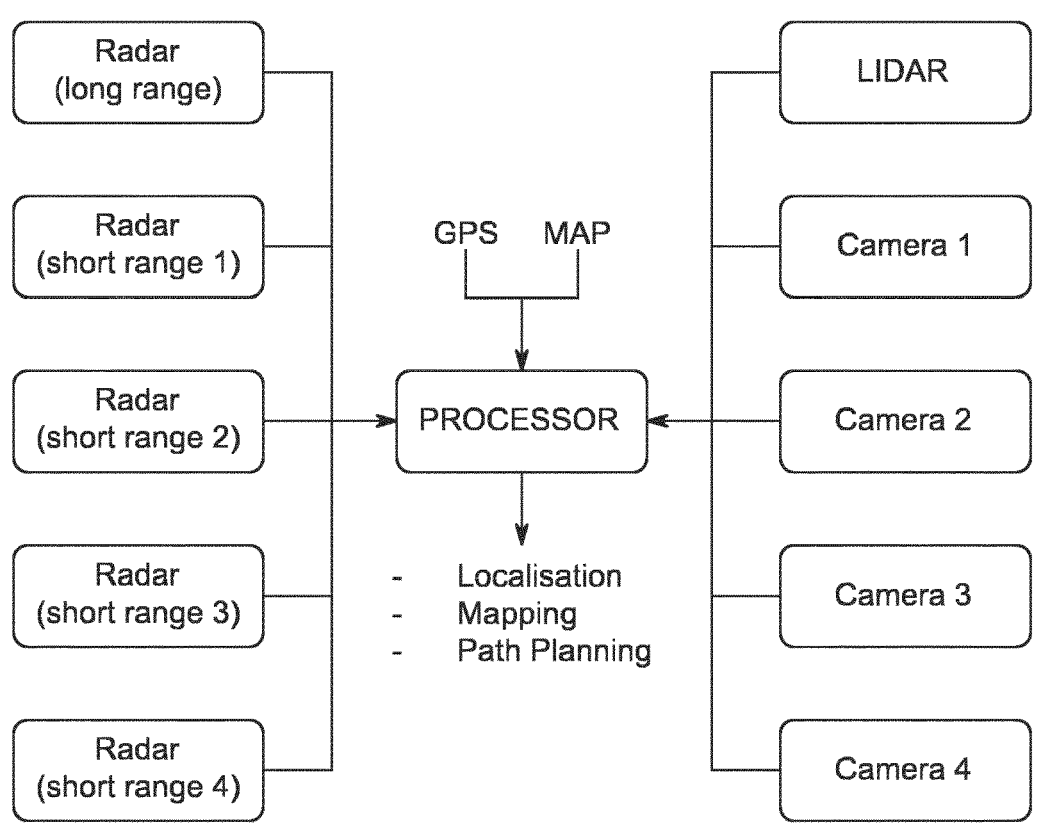
FIG. 2 shows a prior art system for fusing the output from different sensors.
Figure 3:
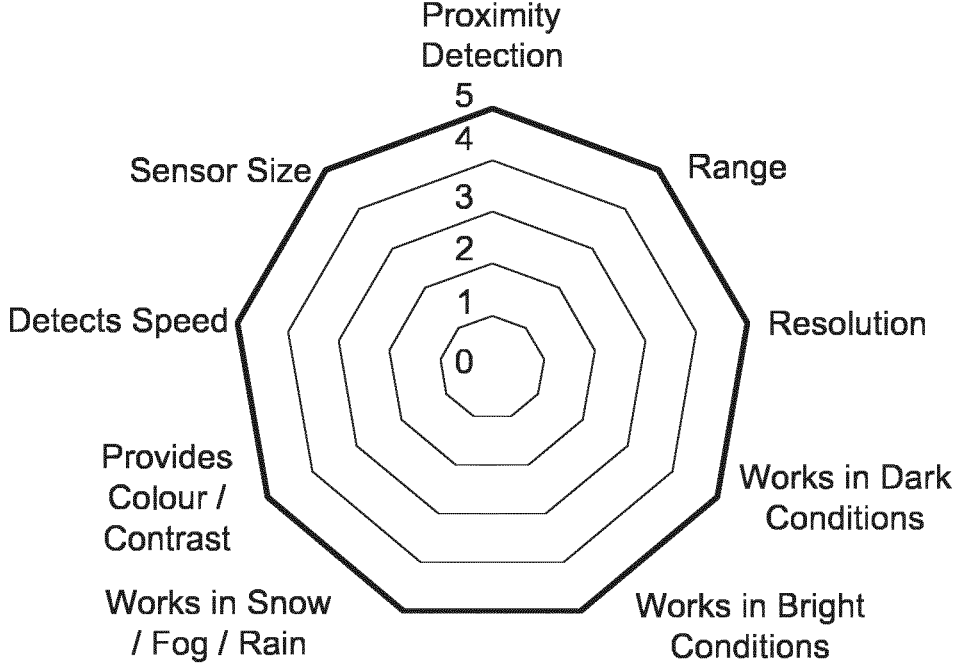
FIG. 3 shows a spider plot of the strengths of a fused sensor system.

As used herein the word 'or' is intended to be an inclusive or—i.e. 'A or B' means: A, B, or A and B. By combining the output from the sensors shown in FIG. 1 (e.g. using the system shown in FIG. 2), the fused sensor system can be obtained. FIG. 3 shows a spider plot of the performance of one such fused sensor system. However, fusing sensors together, while physically simple, requires a great deal of software manipulation.

Figure 4:
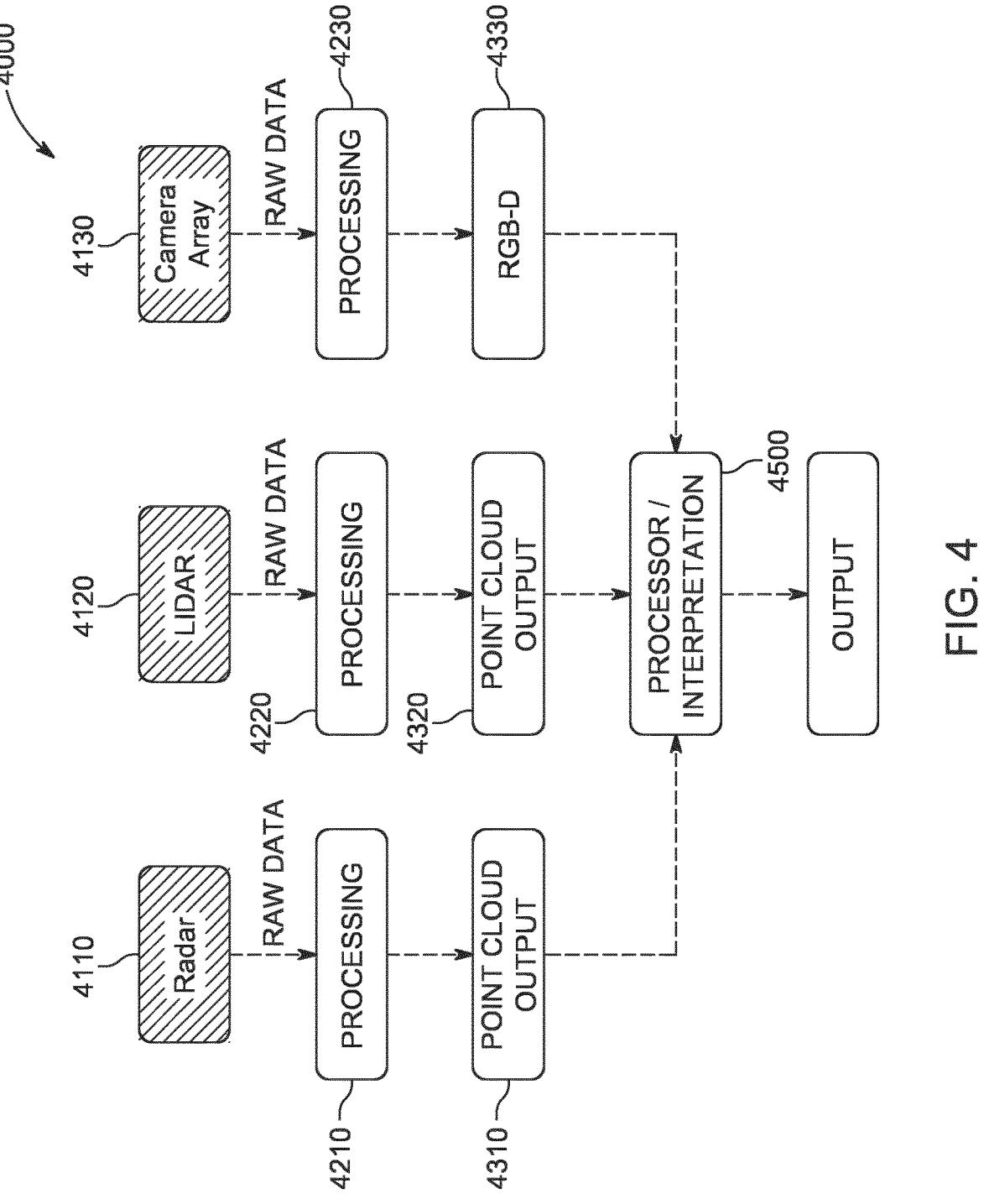
FIG. 4 shows a typical prior art system for fusing the output from different sensors, where the results from the sensors is fused.

FIG. 4 shows a prior art system 4000 that fuses sensors 4110, 4120, and 4130. Each sensor 4110, 4120, 4130, has its respective processing stage 4210, 4220, 4230 and output stage 4310, 4230, 4330. The outputs of the sensors are provided to a processing unit 4500 for interpretation. The processing unit detects collision hazards and provides an output to the user indicative of the presence of a collision hazard.

Figure 5:
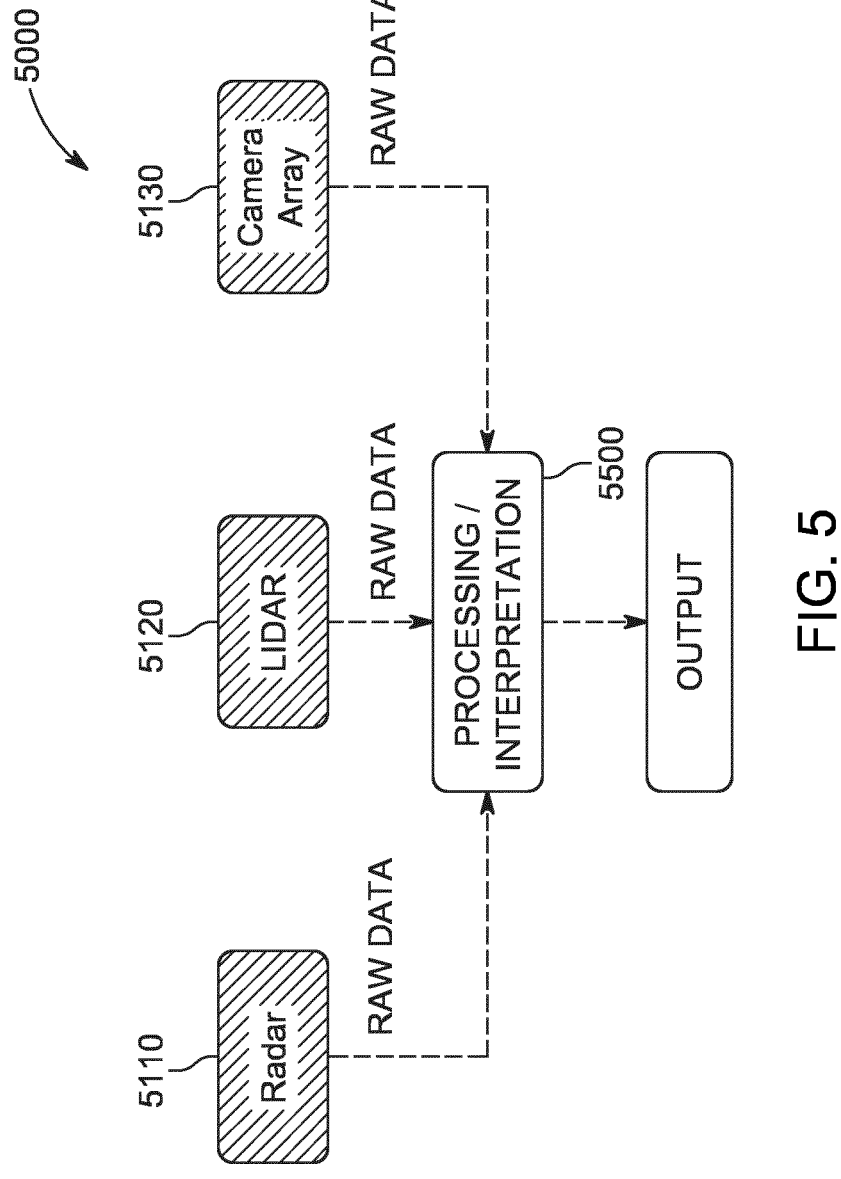
FIG. 5 shows an alternative prior art system, where the raw data from sensors is fused.

FIG. 5 shows a system 5000 where the sensors 5110, 5120, 5130 are fused at the sensor level. In contrast to the system 4000 shown in FIG. 4, the raw data from each of sensors 5110, 5120, 5130 in the system 5000 of FIG. 5 is provided directly to a processing unit 5500 in the system 5000 shown in FIG. 5. Thus, a processing step is removed when sensors are fused at the sensor-level. As will be apparent to those skilled in the art, the processors 4500, 5500 in systems 4000 and 5000 may comprise many elements.

Figure 6:
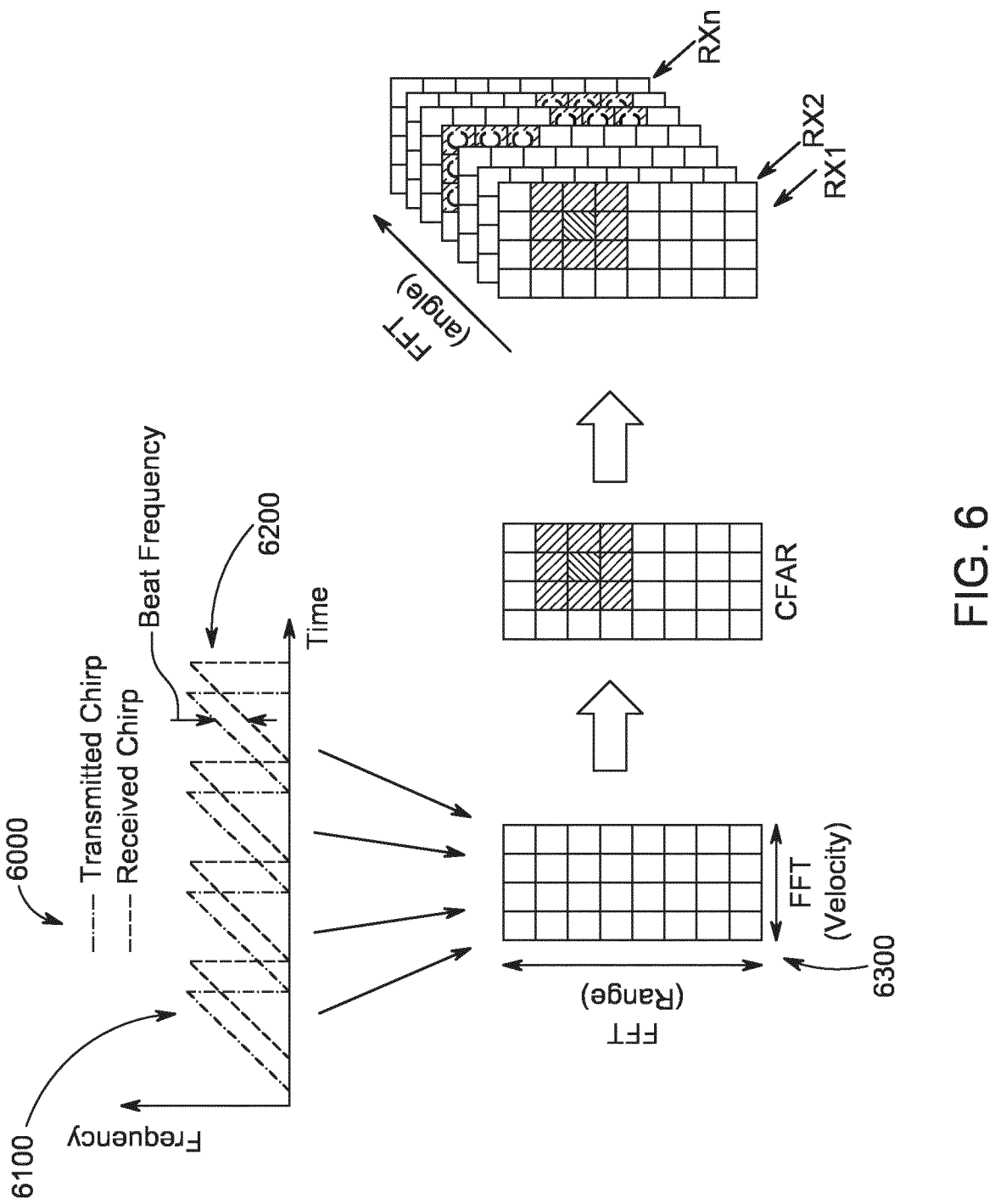
FIG. 6 illustrates the processing of a Frequency Modulated Continuous Wave (FMCW) modulation signal.

By way of example, the main steps required to process a common type of radar signal are now discussed. One such common radar signal is a Frequency Modulated Continuous Wave (FMCW) modulation signal. As shown in FIG. 6, the FMCW waveform 6000 is a complex sinusoidal waveform made up of chirps 6100 whose frequency increases linearly with time. FMCW radars transmit chirps 6100 in a periodic fashion. The period is referred to as the pulse repetition interval (PRI). Through transmitting a linearly increasing frequency chirp periodically a sawtooth waveform is obtained. However, other waveforms are available through using other types of chirp.

With continuing reference to FIG. 6, the reflection from an object (this reflection is also known in the art as the echo)

will contain a delayed and attenuated copy of the transmitted chirp. By mixing the received signal with the transmitted signal, a complex sinusoidal waveform is obtained. The frequency of this signal is equal to the difference between the frequencies of the transmit and receive signals. This waveform is known as the beat signal and its frequency known as the beat frequency. The beat frequency is proportional to the distance to the object. A processor stores a plurality of the beat signals corresponding to a plurality of chirps within a matrix which is referred to herein as a 'frame' 6300 which allows the determination of the doppler frequency change along the 'slow' time for each range bin.

The estimation of the beat frequency is usually completed in the digital domain, after the beat signal has been digitally sampled. Since the beat frequency is much smaller than the radar bandwidth, a low-speed analogue-to-digital converter (ADC) can be used. By sampling the beat signal, the processor obtains samples for each chirp and places each sample into separate columns of a matrix. The rows of the matrix correspond to time taken across a single chirp (which is referred to herein as the 'fast' time). The columns of the matrix correspond to the time taken across multiple chirps (which is referred to herein as the 'slow' time.

In the next processing step, a Fast Fourier Transform (FFT) may be performed on each column of the matrix 6300 to convert the signal from the discrete (digital) time domain to the discrete (digital) frequency domain, in order to determine the range of the object by means of detection of the beat frequency. By applying a further FFT along the rows of the matrix 6300, the velocity of the object can be determined through detection of the doppler frequency. The use of these two FFTs is commonly called a 2D FFT and allows objects to be determined in both range and velocity. The result of the 2D FFT is a matrix of cells, or 'bins', with the rows corresponding to the range of detected objects, and the columns corresponding to the velocities. A concomitant benefit of performing the 2D FFT is that it lowers the noise floor through matched filtering of the object's beat and doppler frequencies.

As most radars have many receive ports (including real and virtual ones in a MIMO radar), the processor may be configured to calculate instantaneous range-velocity measurements as described above for each of the receive ports. This allows the processor to form a 3D matrix. The processor can be configured to perform a further FFT (which is described herein as a $3^{rd}$ 'angle' FFT or 3D FFT).

Preferably, calculating the instantaneous range-velocity measurements for each of the receive ports is performed after a thresholding step. The thresholding step is a Constant False Alarm Rate (CFAR) thresholding step, where only bins with a signal-to-noise that exceeds a certain threshold are retained. The thresholding step minimises noise and false detections in the system. As a result, the number of angle FFTs which must be calculated is reduced. For example, one angle FFT may be performed for each range-doppler bin which passes the thresholding step.

An angular resolution of under 1° is currently required for automotive safety radars. To achieve an angular resolution of under 1°, a uniform array of more than 100 elements is required. The cost (and power consumption) of processing received signals in real time from such a large array is very high, requiring CPUs that have high floating-point-operations-per-second (FLOPS) capabilities. Alternatively, cheaper and slower CPUs may be used—but this results in greater latency, potentially compromising on vehicle safety.

Figure 7:
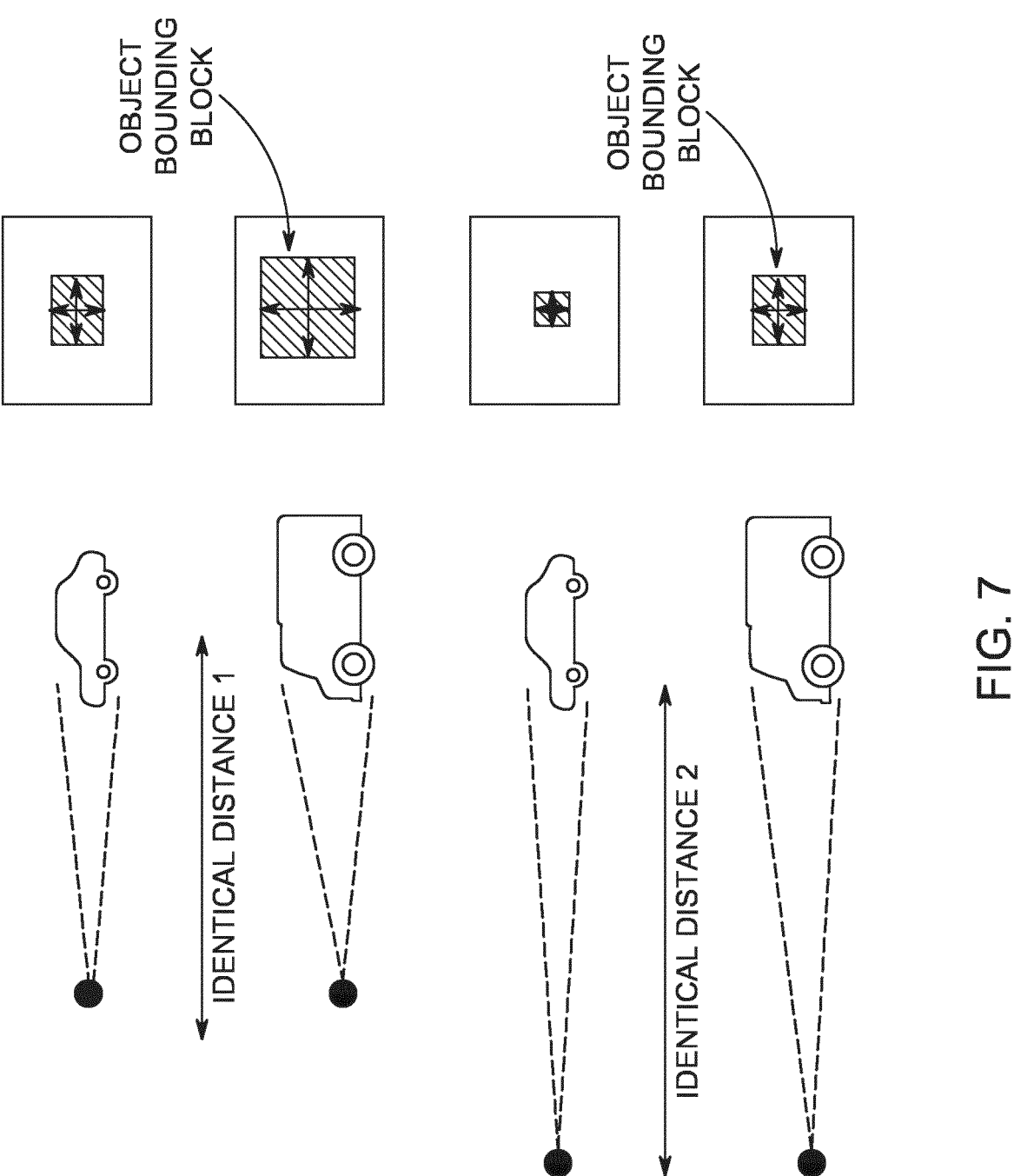
FIG. 7 shows the object bounding box for a car and a truck at different distances from a safety system in accordance with the present disclosure.

At this point partial object identification can be performed. Object identification may be based on the number, or the relative shape, of reflected signals returned from an area. For example, as shown in FIG. 7 the magnitude of the reflected signals at a given distance by a truck will give many, large reflections when compared to the signals reflected by a car at the same distance from the radar. Any suitable prior art object identification techniques (e.g. density-based spatial clustering of applications with noise (DB-SCAN) and Extended Kalman Filter tracking) may be applied to determine the presence, location, size, or velocity of dynamic objects in the scene.

After completing the above steps, the results of the radar detections may be displayed. Those familiar in the art will appreciate that similar processing steps may be performed for both the LIDAR and camera array sensors. It will further be appreciated that, in both LIDAR and camera array systems, the signal processing requires CPUs with higher FLOPS capabilities than those required for radar systems. For example, radar can determine velocity directly from a single reflected signal return—this is not the case for LIDAR or a camera array because they do not detect the doppler frequency. Therefore, it is necessary when using LIDAR or a camera array that calculations are made to determine the distance travelled by objects between consecutive reflected signals or frames.

Figure 8:
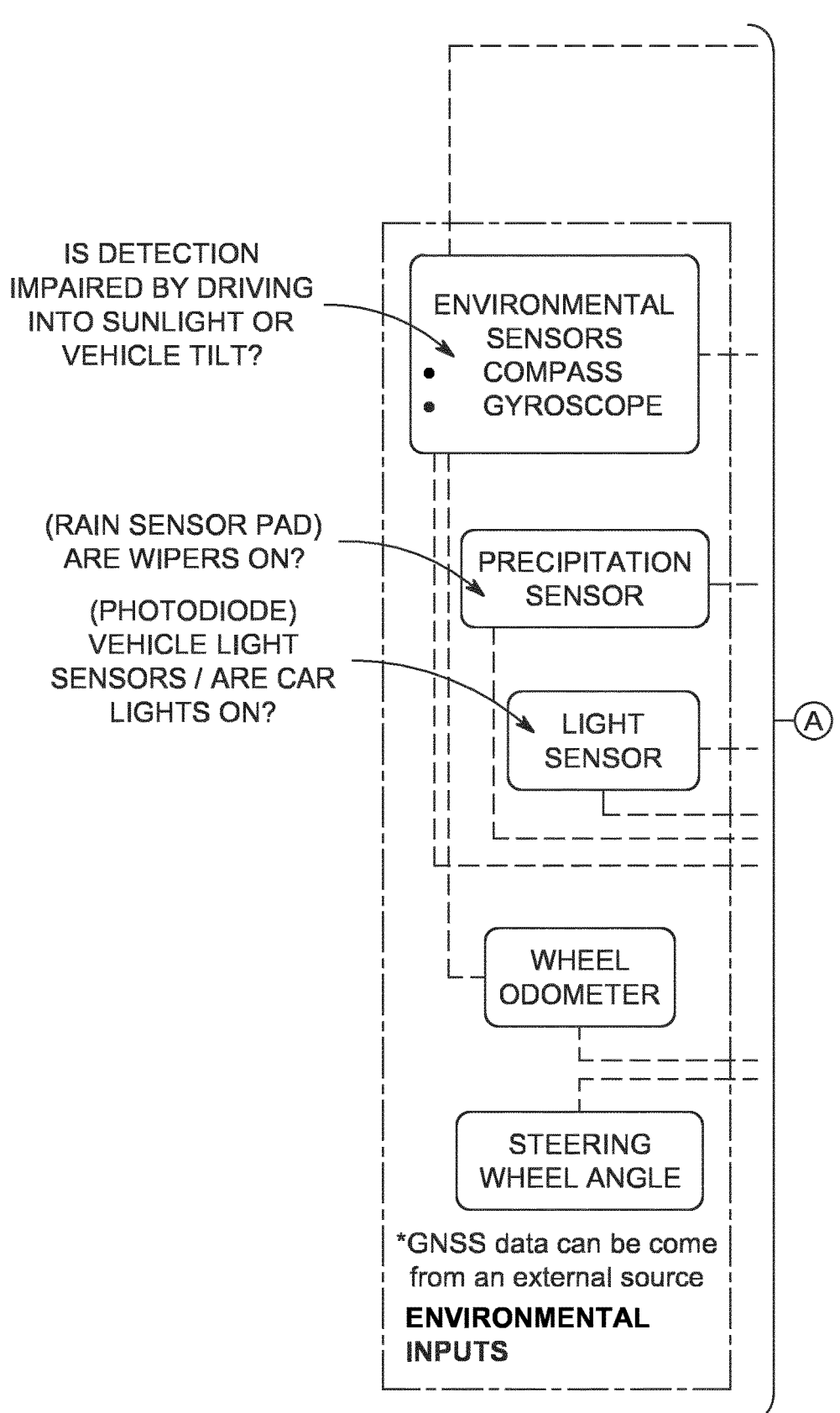
FIG. 8 shows a block diagram of a system in accordance with the present disclosure.
Figure 8:
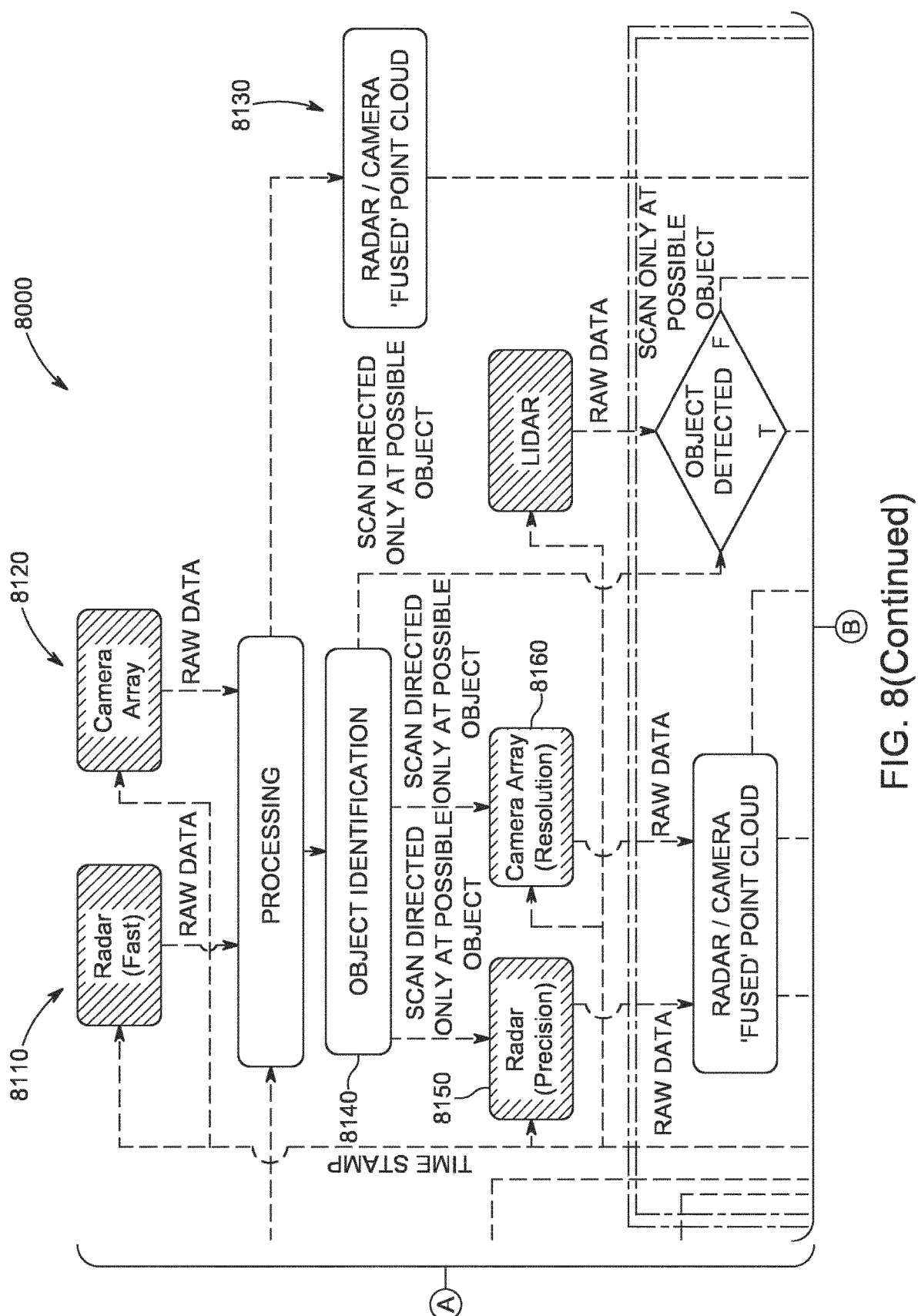
Figure 8:
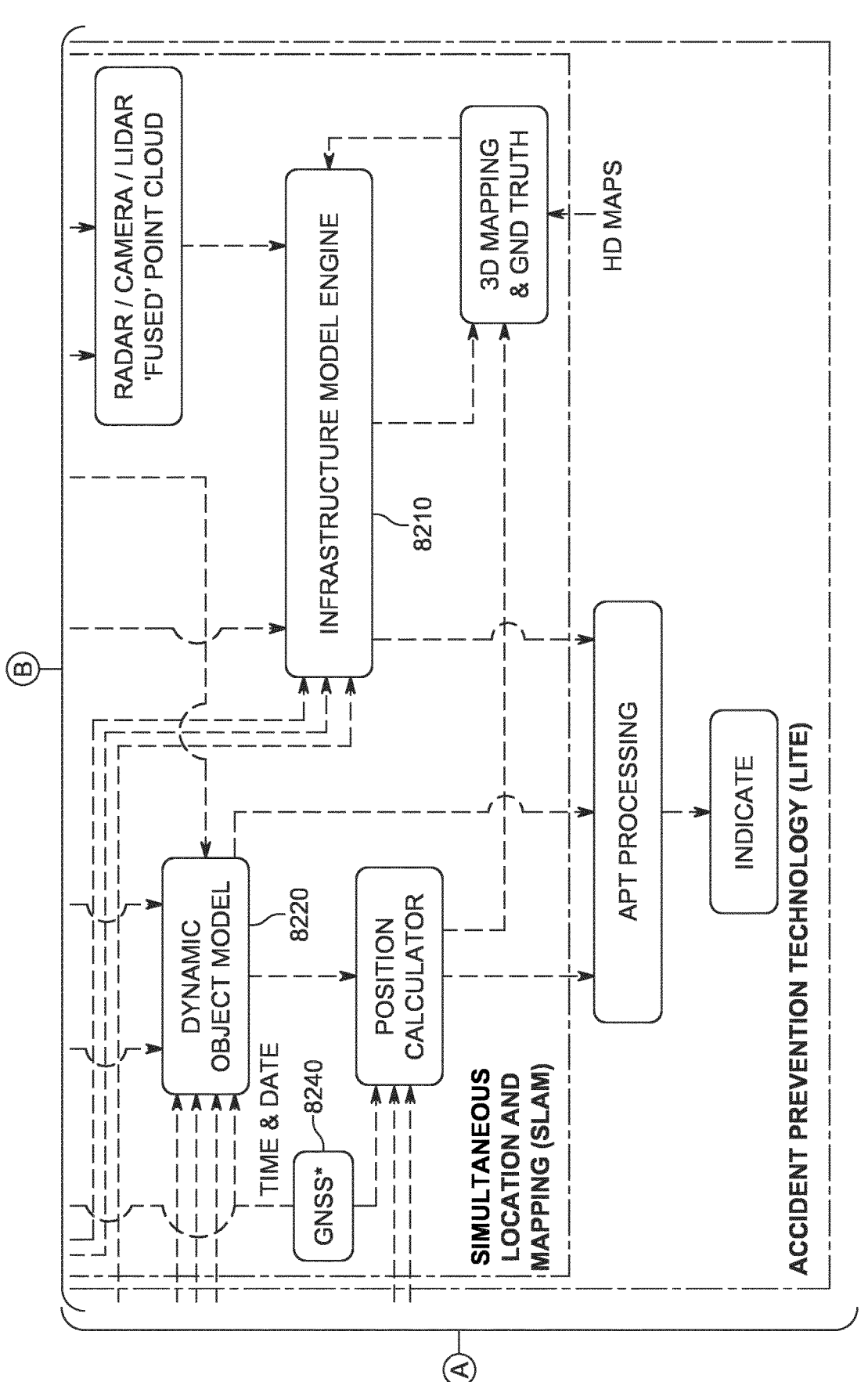

FIG. 8 shows a system in accordance with the present disclosure. Preferably, a fast scan radar and camera array technology are used as the platform backbone. Radar technology is particularly suitable due to its unique characteristics for object detection in the most difficult scenarios. These characteristics include:

Radars use millimetre-wave electromagnetic signals that radiate past an object (e.g. beyond the car in front of the user's car) due to multipath reflections (e.g. where the signals 'bounce' around or under the car in front) thereby detecting objects that are occluded to LIDAR or camera arrays.

Radars typically have significantly longer detection ranges than LIDAR sensors. In currently deployed ADAS systems, radar sensors have detection range of up to 250 m for detection of a mid-sized car while the most common spinning-type LIDAR systems have 50-100 m range, with this range varying depending on an object's reflectivity. Detection using radar sensors therefore provides more time to take action or alert the driver upon the detection of an obstacle ahead.

Because of the use of millimetre-wave electromagnetic signals, radars are less affected by weather. The electromagnetic signals used by radar are not unduly deflected by dust, rain, fog, and snow. Furthermore, radar works in all lighting conditions. However, LIDAR and camera arrays operate at shorter wavelengths than radars. As a result, the accuracy of LIDAR and camera arrays is reduced in poor visibility weather or poor lighting conditions because of the increased scattering of the transmitted and reflected signal. Furthermore, camera arrays are greatly limited in range when operated in poor lighting or low lighting.

It is possible to instantaneously measure the velocity of objects with a radar, since radars can detect the doppler frequency shift associated with a moving object. Thus, less processing is required to obtain an object's velocity. In contrast, typical LIDAR systems need to calculate object motion using frame-to-frame position changes.

When analysing reflected signals in a radar system, FFT-based processing techniques are typically used to calculate range, velocity, or angular position. FFT processing can be easily parallelised, in GPU processors for example. As a result, processing and detection of targets is rapid, resulting in faster reaction times and ultimately thereby utilising less computing power.

The coordinate data obtained from the radar comprises radial range, velocity, and angular position. The coordinate data may be in the form of a point cloud, signal projection (whereby the radar point clouds are transformed onto a 2D image plane), range-azimuth 'heatmap', or 'range-doppler' heatmap.

A camera array comprising a plurality of cameras can provide stereo camera (or vision) Red Green Blue-Depth (RGB-D) data. This optical data may be fused with the radar data 8130. An AI or machine learning engine can be used to fuse the radar data and the optical data. This is preferably done primarily by 'backfilling' or filling points between angular detections on the radar point cloud. Preferably the AI or machine learning engine is a Convolutional Neural Network (CNN) or, more preferably, a Super Resolution Conditional Generative Adversarial Neural Network (SRC-GAN). The AI or machine learning engine can be additionally used to obtain a plot of colour or velocity data of one or more detected points over the 3D cartesian system. It thereby gives a representation of nearby infrastructure when the velocity of the user vehicle is considered. This in turn enables semantic segmentation to be performed.

Semantic segmentation is used to gain a rich understanding of the scene. The purpose of applying semantic segmentation to point clouds is to predict the class label of each 3D point in a given frame. Semantic segmentation (which is also referred to as Infrastructure modelling), while not being a safety critical function, enables classification of the objects which appear in the immediate surroundings of the vehicle. For example, semantic segmentation allows the system to classify objects as road kerbs, fencing, side walls, road markings, signage etc. Preferably, although the semantic segmentation is ideally run constantly, it can be enhanced using an infrastructure model engine 8210. The infrastructure model engine 8210 is preferably run as a background processing task. Thus, the infrastructure model engine 8210 or other background processing tasks (for example the processing of any available LIDAR data when dynamic objects are not detected), is completed when processing capacity is available. Machine learning is used by the infrastructure model engine 8210 to increase the accuracy of the system when compared to prior art methods. By training this engine using previous images from the camera array, taken as a 'ground truth' (or comparison standard) in a plurality of weather and location types, and by comparing the readings to those taken from previous sensor readings at the same location (if available), the radar, camera array and LIDAR employ machine learning (preferably using SRC-GANs) to identify infrastructure objects earlier.

With continuing reference to FIG. 8, preferably a plurality of the sensors in the system are run continuously. In addition to the infrastructure model, the fast scan radar and the stereo camera array may also be configured to detect moving objects in conjunction with the odometer (or other sensor) used to measure the travelling speed of the user's vehicle. By including the travelling speed of the user's vehicle in the calculation of a moving object's velocity, the velocities of moving objects can be differentiated from the relative velocities of the infrastructure static objects when compared to the movement of the host vehicle, and static objects directly in front of the host vehicle. These object detections are input to the dynamic object model, which combines the data to estimate a classification, size, distance, direction, velocity, or direction of travel of the object.

If no object is detected by the fast, long-range radar or the camera array, the system is operated in a first scanning mode. In the first scanning mode, the infrastructure point cloud is 'fused' with available LIDAR detections. The first mode is used to identify potential hazards. To put it differently, the LIDAR is used to scan a wide area and the data from the LIDAR is fused with point cloud data from the fast, long-range radar and the camera array before being analysed in the infrastructure model 8210. In one embodiment of the invention, the wide area or wide field of view comprises an angular region in excess of 120 degrees. However, if an object appears in the fast, long-range radar detection or the camera array that raises a safety concern (either moving or static as defined above), the system is operated in a second scanning mode. In the second scanning mode, the wide area scanning LIDAR processes described above are halted. Instead, the LIDAR is operated to process scans over a narrow area and is focused on a small angular region around the detected object(s). In one embodiment of the invention, the narrow area or narrow field of view comprises an angular region less than 20 degrees around the object. Similarly, the precision mode radar 8150 and high-resolution camera array 8160 are operated to concentrate their sensors on the same region (i.e. a region containing an object(s)). By concentrating in a narrower region, the radar outputs and the high-resolution camera images can be processed more quickly as complexity is reduced. This highly accurate data can be used to generate an additional fused point cloud. This fused point cloud can then be added to the dynamic object model 8220 for object identification and tracking, and to further enhance the infrastructure model using engine 8210. The second scanning mode is for accurately tracking potential hazards.

While the fast scan 8110 and precision radars 8150 are depicted as two separate units in FIG. 8, in practice these can be the same unit with e.g. a mode or range select function. Alternatively, the fast scan 8110 and precision radars 8150 can be composed of multiple units pointed in different directions to cover a wide area, with individual units each covering a narrow area. Two camera arrays 8120,8160 are also shown. The two camera arrays 8120,8160 can also be the same unit with e.g. a mode or resolution select function. While a radar, LIDAR and camera array are discussed here as examples, those skilled in the art will recognise switching between scanning or processing modes as discussed above can be applied to any combination of alternative fused sensors. Operating a sensor in two modes reduces the size and the cost of the system.

One further type of data from a sensor that can be incorporated into the system to further reduce the processing time is the location data from a GNSS (Global Navigation Satellite System) receiver. Data from the GNSS receiver can be used in a number of different ways. For example, the location data from the GNSS signal can be used (when available), in conjunction with preloaded map data and the infrastructure model 8210, to help determine the angle relative to the user's vehicle where most accident scenarios are likely to occur. Thus, for example, if the user's vehicle approaches an intersection where location data from the GNSS signal suggests that other vehicles will be more likely to come from the left or right rather than in front, processing of data from sensors at these angles is given priority.

The dynamic or moving and inline object determinations and the infrastructure model engine predictions are strongly dependent on the environment that the user's vehicle is in.

Thus, both the dynamic object model 8220 and infrastructure model 8210 units have options for environmental inputs which may be used if required. As the environmental inputs may include both light and precipitation sensors, the dynamic object model can determine if the detection data from the LIDAR or the camera array will be accurate. LIDAR and cameras do not function well in wet or foggy conditions, and cameras do not function in the dark. Thus, by detecting these conditions, it is possible to determine if these sensors will function as intended. It is important to note that, even in these adverse conditions, data from such sensors is still considered but not prioritised. Furthermore, by incorporating a compass and time and date information, instances such as driving towards the sunset or sunrise (which can also cause detection difficulties in LIDARs and cameras) can be recognised and mitigated. In addition, a gyroscope may be incorporated. Thus, the angle of tilt of the user's vehicle can be determined and provided to the system. The angle of tilt affects the detection signature of the dynamic objects. As many of these environmental sensors are already included in several models of vehicle, there is limited or no additional cost to the sensor suite for this increased functionality. It will also be appreciated that the invention is not limited by the environmental inputs disclosed here and can be applied to any number of, or no, environmental inputs.

Asynchronous sensors, or sensors that run independently of other sensors in the system, give rise to integration problems. This is because sensor fusion methods generally require either synchronous measurements, or measurements to be taken with perfect time information, i.e. information needs to be included in the data which states the exact time the data was obtained by a sensor. As typical prior art systems generally lack a system-wide reference time, an assumption for a time reference in asynchronous sensor systems must be made. If this is neglected (i.e. if the time taken to relay the sensor data to the processor is ignored), it can lead to decreased infrastructure information and confusing object determination and ultimately to a reduction in the detection range and accuracy of the system. Furthermore, the effects of these timing issues are a larger problem with fast sampling sensors and in situations where many observable dynamic objects are detected.

Time synchronisation is typically solved using synchronisation protocols (such as for example the Precision Time Protocol) where a fixed, measured time delay is incorporated in the processing algorithms. However, the use of a fixed time delay neglects the effects of environmental changes such as temperature change. Further, these fixed time delays are typically measured on manufacture and do not take the sensor position within the vehicle into account. As such, fixed time delays, while necessary, can be error prone, especially in low-cost flexible solutions as they are not identical from one user-case to the next. In essence, the time synchronisation of sensors can be viewed as a problem of tracking the relative phase shifts of the sampling times of the different sensors, which can drift over time (for example if the local reference oscillator in each is not synchronised). Without assumptions on the sensor measurements themselves or on the connections between sensors etc. these phase changes cannot be measured. However, this problem can be overcome by incorporating a GNSS receiver at each sensor. GNSS signals include a pulse-per-second signal, typically accurate to within 100 nanoseconds. This can be used, preferably with the National Marine Electronic Association (NMEA) time data present in a GNSS signal, to generate and apply a time stamp to the incoming sampled data from each sensor. The time delay for data captured at each sensor can therefore be calculated and compensated for when each sensor measurement is compared within the dynamic object model unit 8220.

Figure 9:
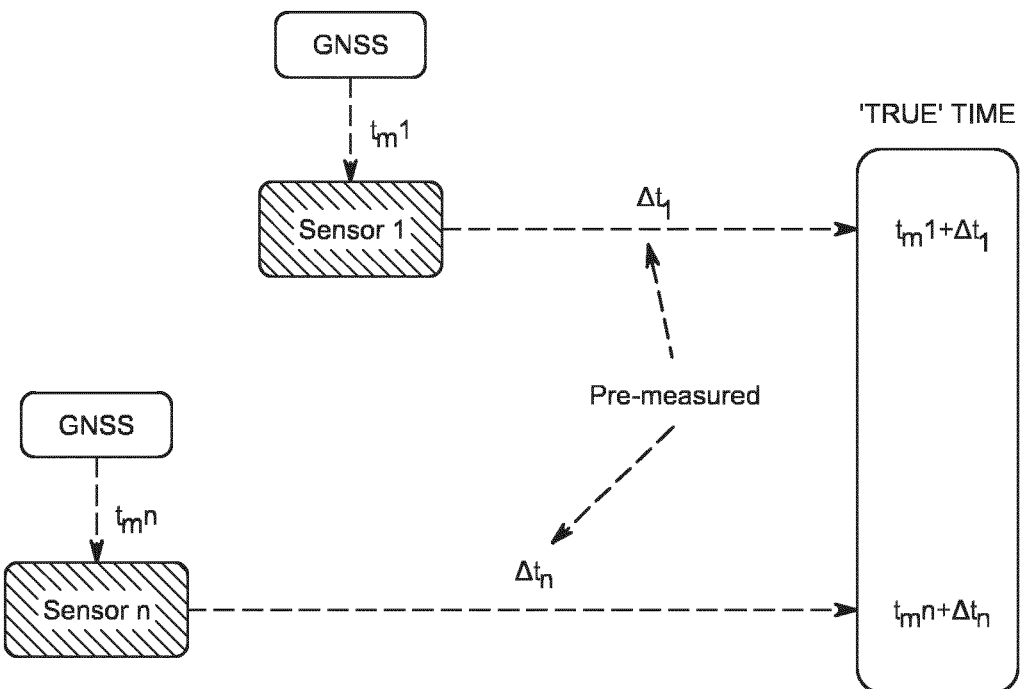
FIG. 9 shows a block diagram of a subsystem of the present disclosure.

However, due to the mounting positions of the different sensors within a user's vehicle it may be preferable to use a single GNSS antenna/receiver 8240 which is linked to each of the different sensors, as shown in FIG. 8. By using this method, the time error is limited to a sensor dependent constant (or an inherent small phase error within the sensor design, which can be ignored) and the difference in data-link lengths from the GNSS receiver 8240 to the different sensors. As the sensors are fused at the sensor level (e.g. with processing carried out 'at-the-edge' or within the sensor) and with the GNSS receiver preferably placed as close as possible to all the sensors, this difference can be kept to a minimum and can be measured. The 'true' time stamp can therefore be defined as the sampling instant ($t_m$,n=recorded or 'marked' time of the $n^{th}$ sensor) plus this delay ($\Delta t_n$=the time taken for recorded measurement of the $n^{th}$ sensor to reach the combination point), and the true stamp can be interpreted as the sampling instance with this pre-measured constant error ($\Delta t_n$) added, as shown in FIG. 9. While time stamping is achieved by use of a GNSS receiver in this disclosure, the invention is not limited to this method and time stamping at each sensor can be achieved by any other suitable means.

The previously highlighted aspects of a) fusion with reduced processing, b) environmental predetermination, c) time stamping and d) processing at-the-edge are preferably all contained within the first embodiment of this invention. Ideally, large amounts of 'safety' sensor data are obtained only at one or more specific regions of interest as indicated by the fast scan radar, and only pertinent safety data is processed from the sensors which require the highest levels of processing, resulting in quicker 'danger' identification. When this is combined with one or more of pre-loaded maps, vehicle speed and location data, and aligned to the aforementioned infrastructure modelling, warning data can be presented to the driver if a possible danger is detected. In this embodiment, the dangers monitored are restricted to more common categories of dangers such as e.g. speed to object, distance to object, direction of travel etc. Such a system is referred to herein as an Accident Prevention Technology (APT) Lite system.

More detail is now given to some of the processing steps for a preferred embodiment of an APT Lite system. It will be appreciated that many detection points will occur due to multiple sources of reflection from the detected object. The number of these reflection sources is due to the performance of individual sensors or the type or size of object. Thus, for example, a radar in high precision mode will return more reflected points than a radar in fast sweep mode, due to higher range resolution and/or angle resolution of the radar in high precision mode. When a number of points are detected in the same region (angle, radial range and velocity) of each sensor, they are clustered into blocks. The spatial extent of the blocks in each axis can be interpreted as a vehicle type. While this is a well-known technique in the prior art, the present disclosure is distinguished in that it is only performed in the second scanning mode—i.e. it is performed on the results from measurements obtained from small angular regions defined earlier in the first scanning mode. This approach, preferably in conjunction with the use of additional environmental data, greatly reduces the time taken to complete this processing step because vast amounts of unnecessary data are ignored.

In addition, by using a similar form of the machine learning to that used in the infrastructure model engine, objects can be identified earlier. With reference again to FIG. 7, two instances are shown which compare which detection point groupings of large and small vehicles. For example, a truck 'object' at a distance of 2× gives a reflected reading that is approximately the same as that given by a car 'object' at a distance of 1×. However, by considering the range to the object or the size or type of the object, the object can be classified correctly.

In the APT Lite system of the present disclosure, object classification is performed using a predefined lookup table of vehicle types. In particular, an object is classified by accessing a predefined classification based on one or more of the detected object's size, shape, and colour (from the camera array). Preferably the classification is also based on the orientation of the user's vehicle relative to the detected object, i.e. the object may present an L-shaped or I-shaped reflection in the receive point cloud, depending on its orientation relative to the user's vehicle. Preferably, in a case where intermediate values occur, the largest vehicle type is selected to improve safety. As false or problematic readings from the LIDAR and camera array can be identified using environmental sensors as mentioned earlier, the readings from the different sensors are combined using a 'worst case' rationale. Thus, if the position for an object detected by a sensor does not perfectly align with the position of the object detected by another sensor with environmental considerations such as light or darkness taken into account, then the differences in position are resolved by assuming the object is at e.g. the closest or highest risk position detected by both the sensor and the other sensor. Likewise, if the object size detected by a sensor does not align with the size of the object detected by another sensor (with environmental considerations taken), the size is resolved by assuming the object is the largest detected by both the sensor and the other sensor. In this manner, the object is assumed to be the largest and closest (and therefore conceivably most dangerous) object that fits the readings from the sensors.

Figure 10:
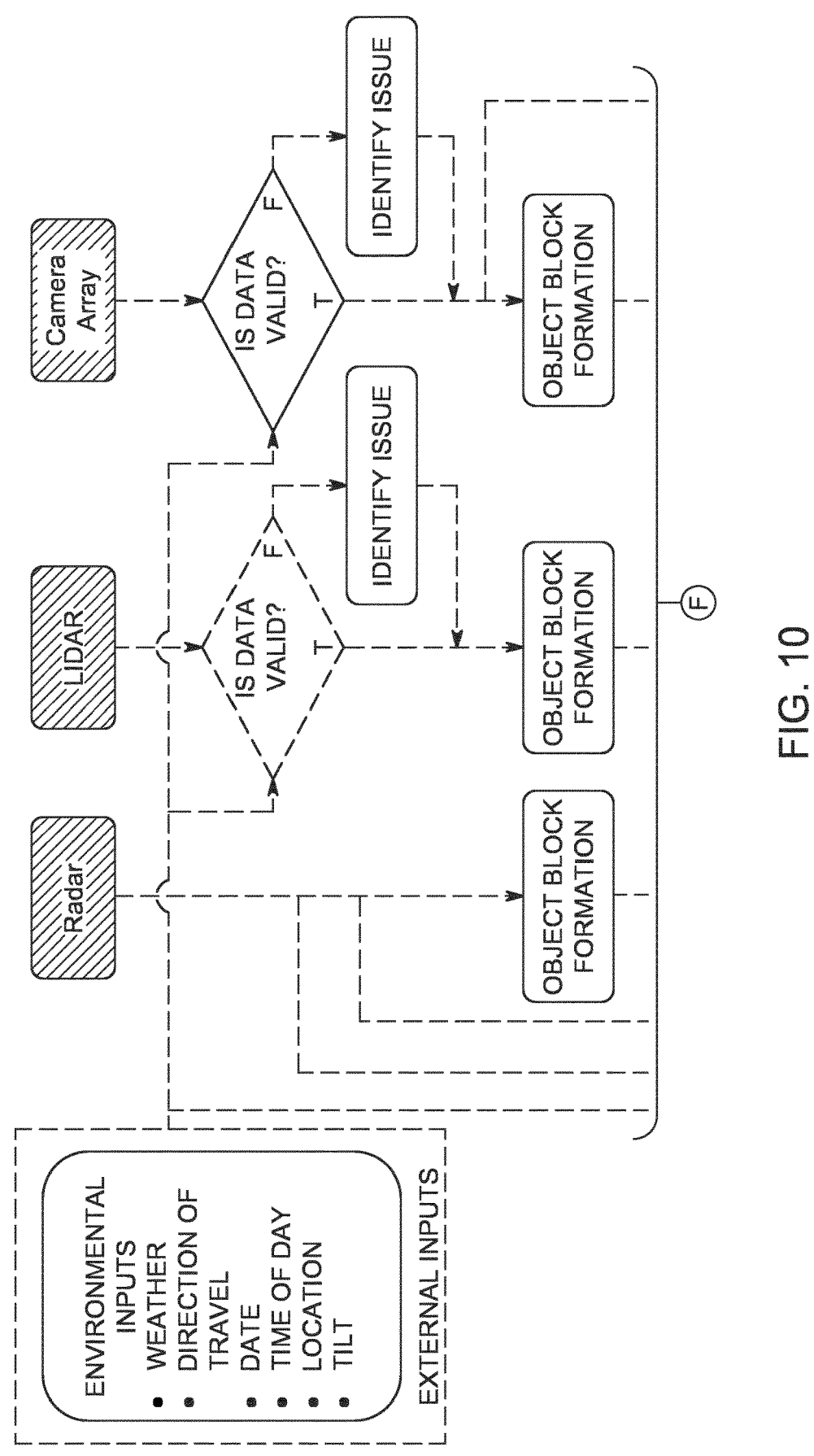
FIG. 10 shows a method in accordance with the present disclosure.
Figure 10:
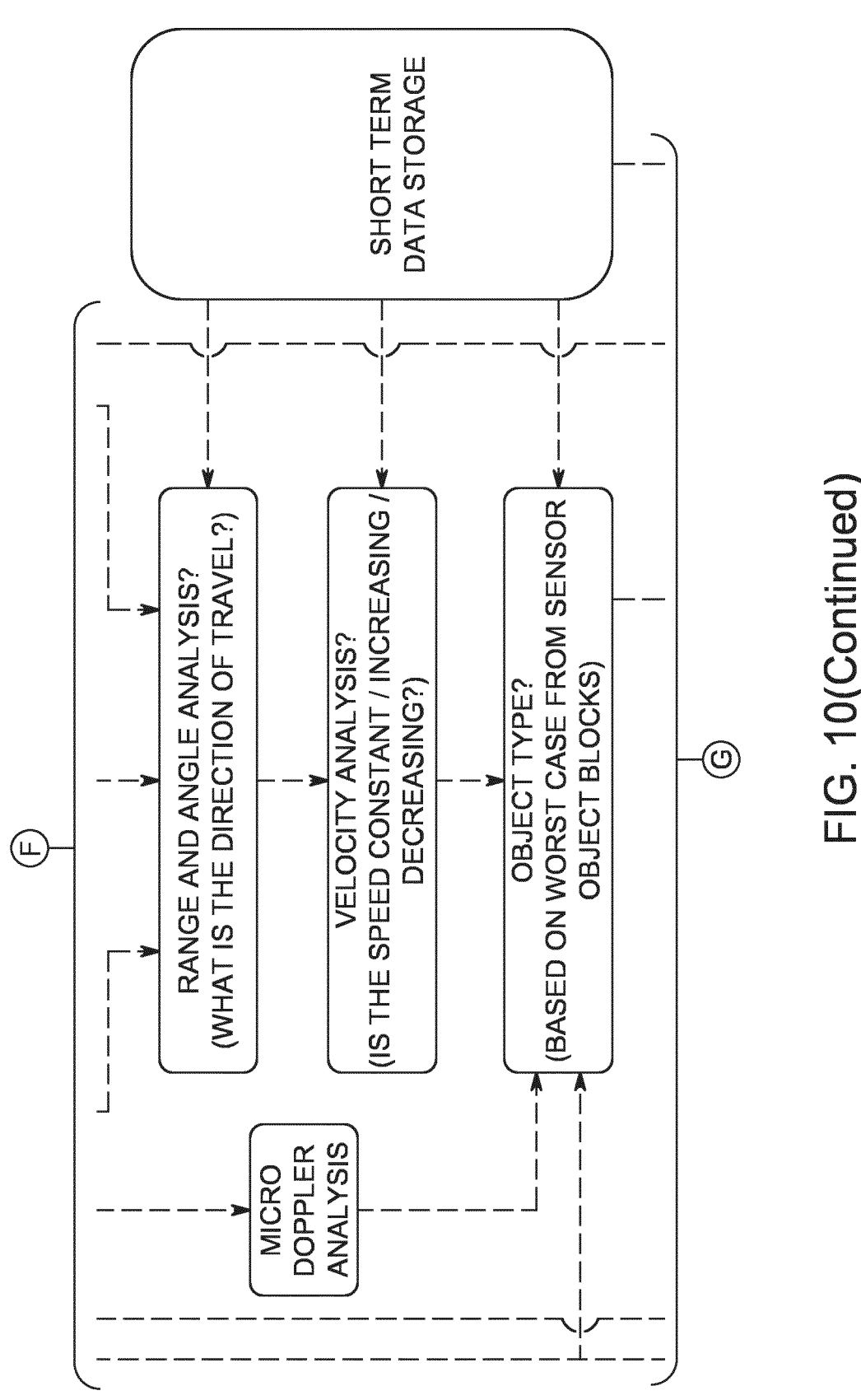
Figure 10:
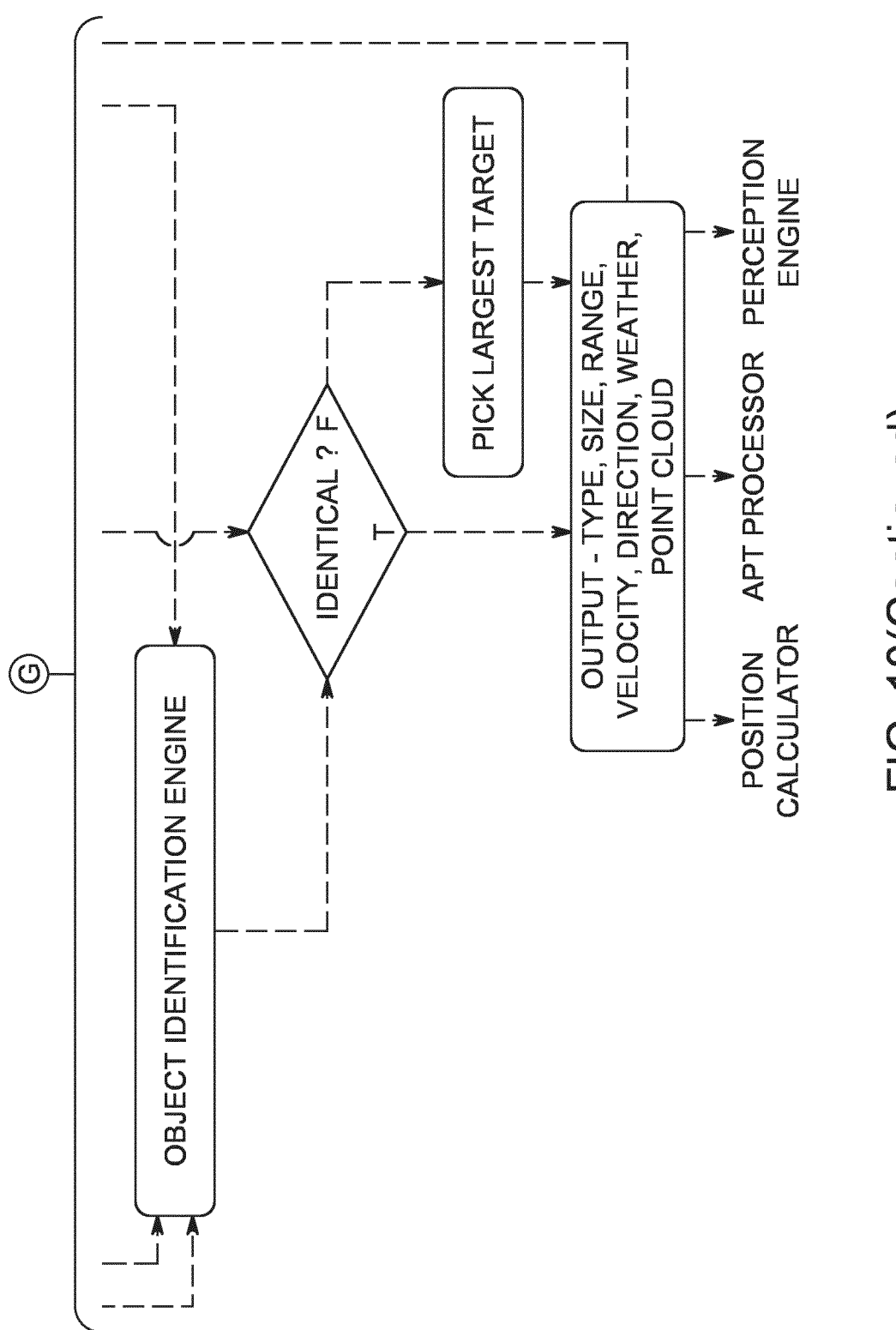

Thus, in the present disclosure, and contrary to the prior art (where 'averaging' of sensor readings is usually applied or where one sensor output is 'decided' to represent all readings), the readings from a suite of sensors, to refine predictions is preferred. Furthermore, a suite of different sensors is useful for further refining predictions over time. For example, as shown in FIG. 10, as an object moves closer towards the sensors, more information becomes available (e.g. such as trajectory, speed variation, etc.) allowing the object detection algorithm to continuously update its output. By performing a continuous micro-doppler analysis from the radar to determine small movements (such as arm or leg movement), the object type is further refined to indicate, for example, a higher probability that the object is a pedestrian. Object classification can be performed adequately at close range by the camera array, but by using a suite of sensors (e.g. combining a camera array with the use of a fast scan radar initially and then again by the use of a precision radar), these detections can be made with much lower latency and at an increased range.

Optionally, to further verify this object identification, the output is continuously compared to that identified by the object detection engine 8220. The object detection engine 8220 is 'trained' using machine learning in a manner similar to that used to train the infrastructure model engine 8210 (to identify objects at distances greater than other methods), with the worst case or largest object chosen (as described previously). In addition to the previously described lookup table, the training of this object detection engine 8220 is preferably performed using camera images to identify object types at close ranges as the 'ground truth' which then can be used by machine learning to identify objects using LIDAR or radar detections at longer ranges than was previously possible. The engine preferably employs a 'You Only Look Once' Convolutional Neural Network (YOLO CNN). While a specific type of comparison methodology and machine learning is described here, the invention is in no way restricted by this. Indeed, any form of object identification, machine learning, or combination of approaches, can be incorporated within the current invention without restriction.

When the outputs from the dynamic object model are combined with the infrastructure data, maps and vehicle location (which is typically calculated in a manner similar to a typical satellite navigation system), the APT Lite system of the present disclosure makes an assessment based on one or more of the following weighted parameters. Preferably, the weighting (or priority) applied to a parameter aligns with the order of the parameter in the list—i.e. the priority of a parameter preferably decreases the lower it appears in the following list.

1) Direction and speed of travel of the object (from the dynamic object model unit)
2) Direction and speed of travel of host vehicle (from the position calculator)
3) Relative position of object (from the dynamic object model unit)
4) Location of host vehicle in a road network—e.g. approaching junction etc. (from the position calculator)
5) Potential weather conditions (from the dynamic object model unit)
6) Size of object (from the dynamic object model unit)
7) Shape of object (from the dynamic object model unit)
8) Visibility—trees, buildings etc. (from the infrastructure model)

Of the above parameters, parameters 1-3 may be used simultaneously.

For a system in accordance with the present disclosure, the relative velocity and position (i.e. the net speed and direction of the object with reference to the host vehicle) is preferably given priority. This is because unless the object is on, or near, a collision course it is deemed to be a low risk. Thus, a car in front travelling in the same direction as the host car at a slower speed is given as high an importance as one travelling in the opposite direction, on the other side of the road, but which could still be on a potential collision course. Both are therefore given sizeable weightings as they are on 'a' or 'near' collision course.

In radar technologies post-clustering tracking filters such as the Kalman Filter are typically used to calculate the trajectory of these other objects.

The probability of a collision course between the host vehicle and the detected object, $P_c$, may be estimated by the APT processor (APT), using the past and present values of the relative velocity (and direction) of the object, $V_O$; the relative velocity (and direction) of the host vehicle, $V_H$; and the position of the object relative to the host vehicle, p. The numerical assessment takes the form:

$$P_c = APT[V_H, V_O, p]$$

The APT processor also estimates the time until a likely collision, based on the relative velocities of, and distance between, the host vehicle and object. The risk is then assessed by weighting the probability of collision with weightings denoted by $w_x$, based on: the available time, $w_{time}$; the location of the host vehicle (given a value from a lookup table for e.g. the bend radius of an approaching curve), $w_{loc}$; the 'weather' related driving conditions including the amount of daylight present (from a lookup table), $w_{weath}$; the size (or shape) of the object, from the vehicle type lookup table, $w_o$; the percentage of reflected points found in a specified space, from a line of sight view, around the outside of the object bounding box, from the infrastructure model, $w_v$. The resulting risk equation takes the form:

$$Risk = w_{time} \cdot w_{loc} \cdot w_{weath} \cdot w_o \cdot w_v \cdot P_c$$

This risk equation gives a numerical value which is scaled, preferably between zero and one hundred. The scaled value is received by the APT platform and used to output an appropriate response or warning based on a sliding scale. For example, the APT platform according to the present disclosure where the value is scaled between zero and one hundred can provide three warnings: where risk scores <60 display NORMAL, 60-80 display CAUTION and >80 display WARNING. The present disclosure is not limited to an equation of this type or form, the weightings or parameters or scaling factor, and any suitable type of equation or algorithm can be used. It is also noted that the disclosure is not limited to the number or type of warnings given, the scores related to them or even by using an algebraic function, where a trained artificial neural network or other form of machine learning could be employed.

Figure 11:
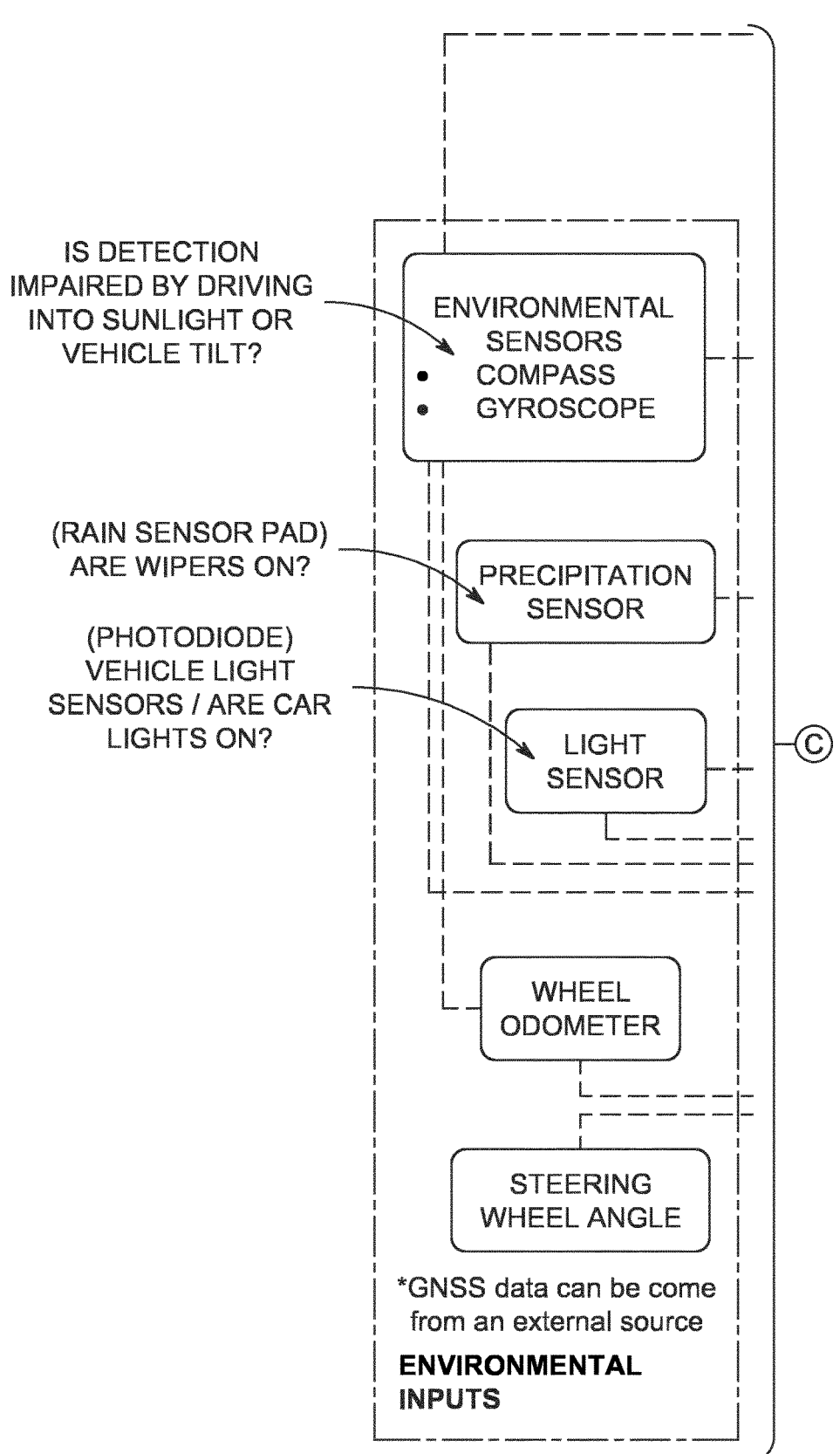
FIG. 11 shows a block diagram of another system in accordance with the present disclosure.
Figure 11:
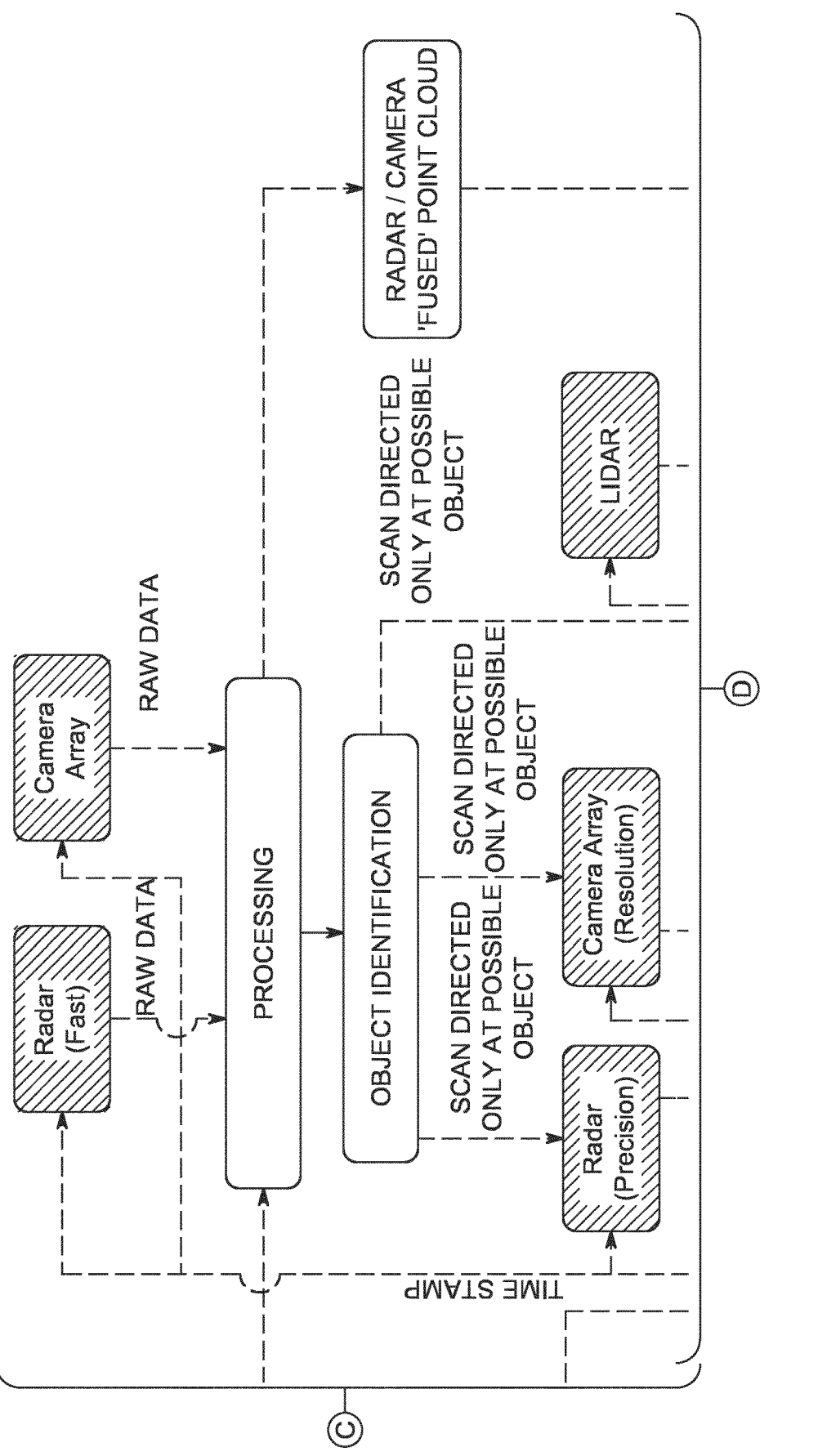
Figure 11:
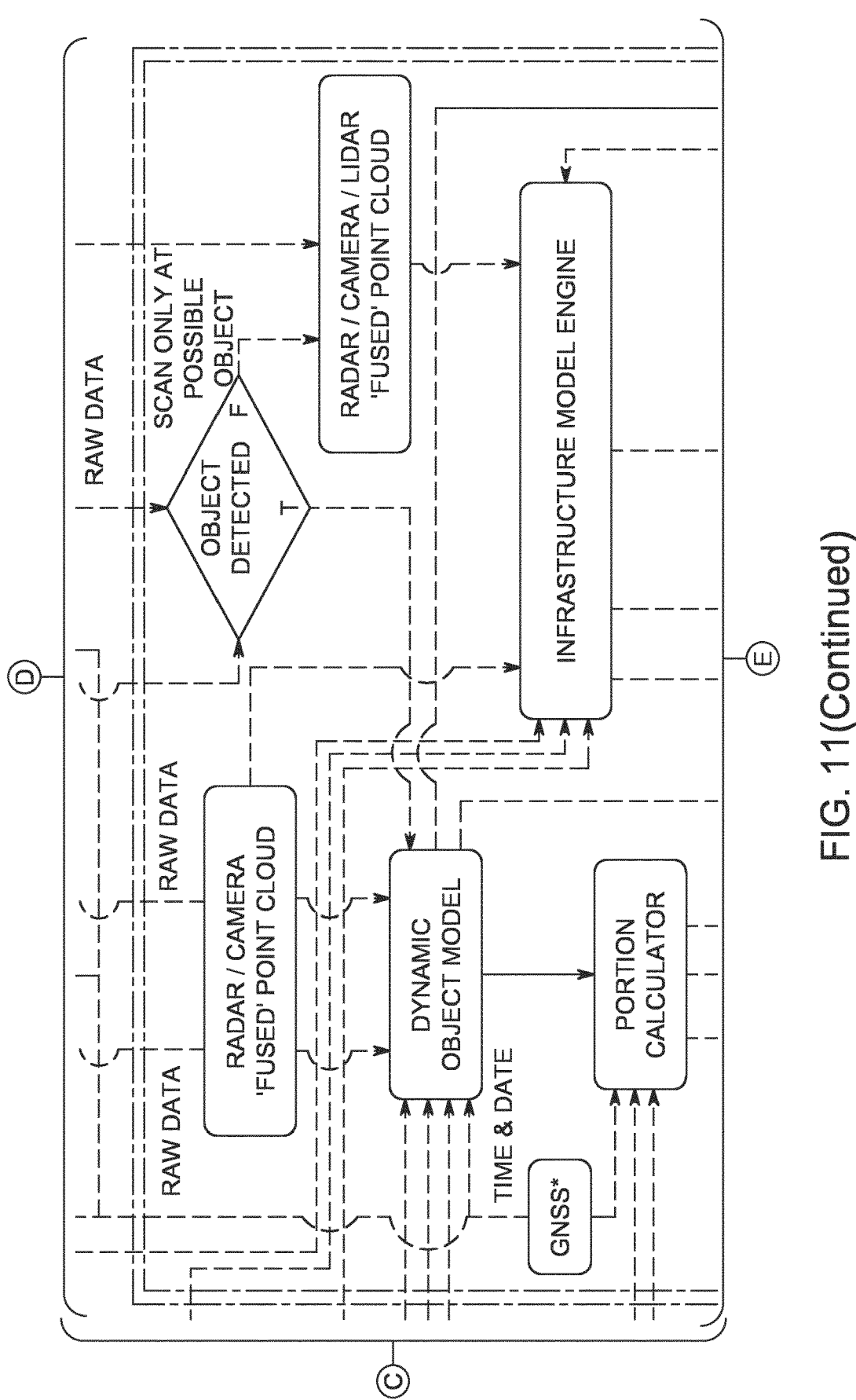
Figure 11:
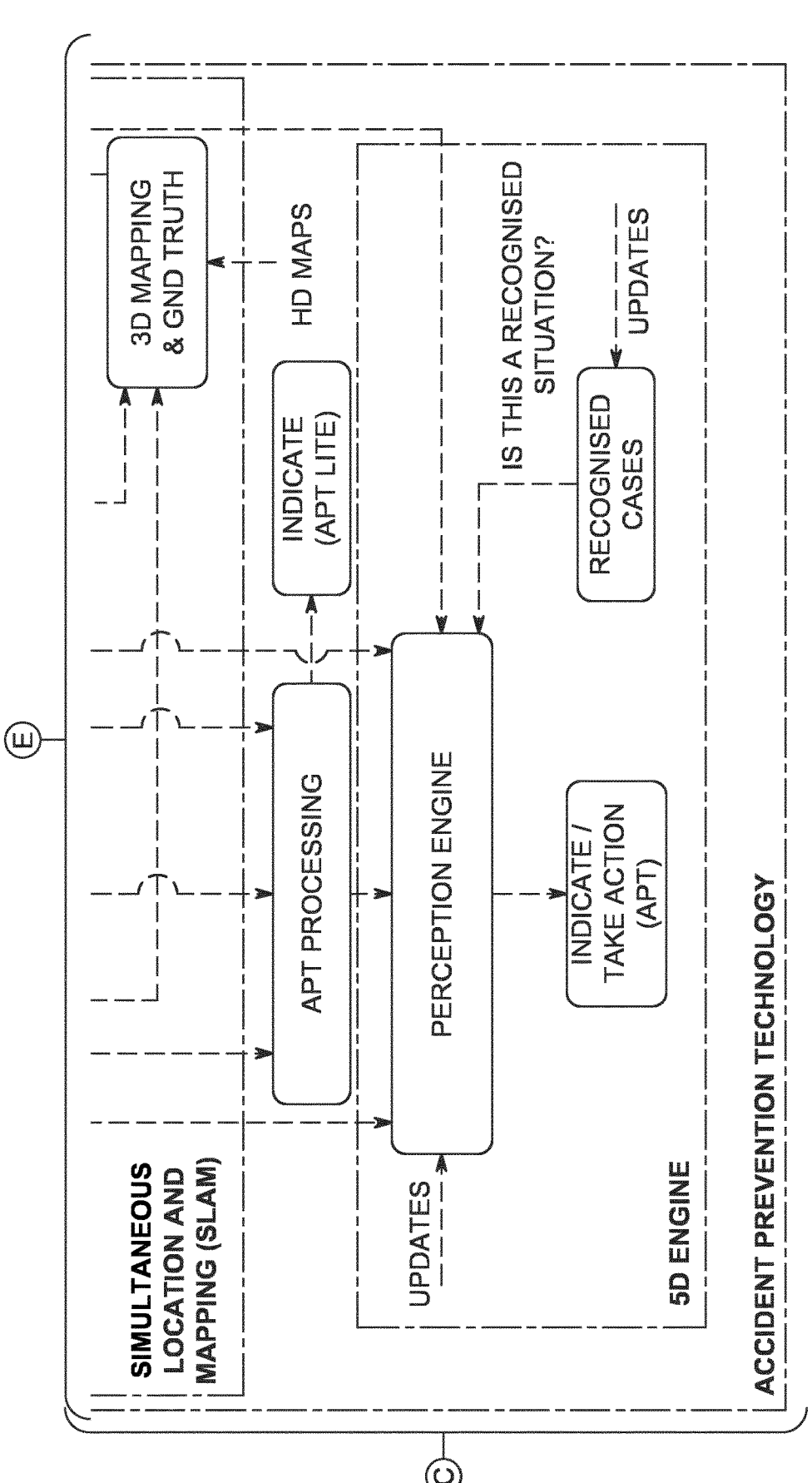

As shown in FIG. 11, a 5D engine may be combined with the APT Lite system to form a 'full' Accident Prevention Technology system. As noted earlier, advanced prior art radars are defined as working over 4-dimensions including range (depth), azimuth angle (length), elevation angle (height) and velocity. However, in the present disclosure, a $5^{th}$ dimension of perception is provided. Machine learning has already been used in the APT Lite system, where algorithmic equations (using both regression and classification) and artificial neural networks are trained to identify infrastructure and objects respectively or to alternatively calculate the risk. In the full APT system, the use of machine learning is expanded further using a 5D perception engine. The 5D perception engine is configured to determine safety critical situations that drivers face. The 5D perception engine may then take preventative action based on this determination—for example warning the driver early of the potential danger or by employing automatic braking or other measures to slow or stop the vehicle. Any suitable form of machine learning can be used to make this determination. The disclosure is therefore not limited to the type of machine learning used in either the infrastructure engine, the dynamic object identification engine, APT Lite or the full 5D perception engine. However, one machine learning system suitable for use in the present disclosure is described below.

An Artificial Neural Network is a model based loosely on the interactions between neurons in a biological brain. Similar to the synapses in a biological brain, where each neuron transmits a signal to other neurons, the 'neuron' in the artificial network receives a signal then processes it, before signalling the other 'neurons' connected to it. In this way the process is reduced to a series of smaller, manageable, interconnected decisions or questions which are weighted in accordance with their importance.

By way of example, the question could be asked, 'Will I stop and buy a coffee on the way to work?'. There are several factors that will go into making this decision, such as 'Will I take public transport to work?' or 'Can I afford to buy a coffee?'. The factors in turn will have a number of influencers or 'inputs' which contribute to the answer and could include the 'weather' forecast for today, the available 'time' I have, or the 'cost'. These factors (and many more) will 'influence' my chosen mode of transport, which in turn could affect the opportunity to buy a coffee.

Figure 12:
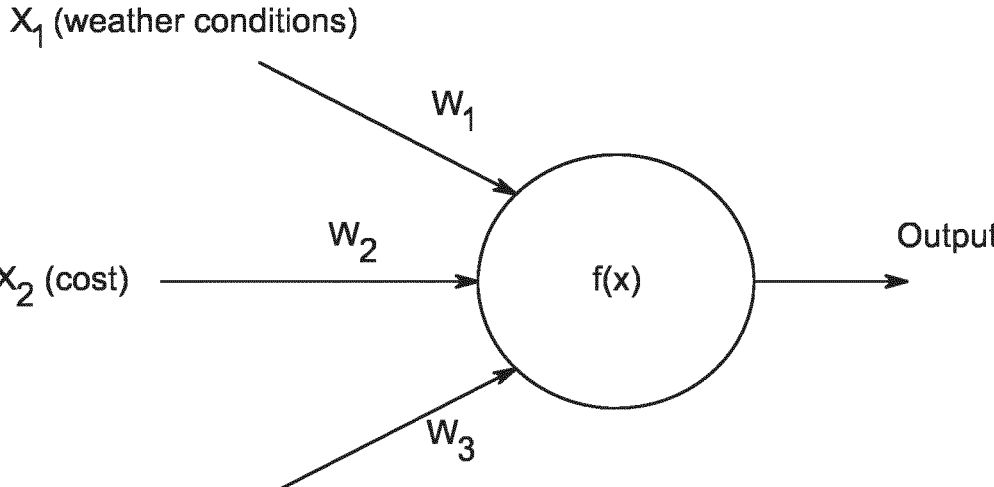
FIG. 12 shows a node of a neural network.

The example of the artificial neuron for the question 'Will I take public transport to work?' using only the inputs of weather, cost and time is shown in the example of FIG. 12. An activation function for this neuron can be written in the form:

$$y = f(x_1 * W_1 + x_2 * W_2 + x_3 * W_3 + b)$$

Where $x_n$ corresponds to the different decision inputs (weather, cost, time); $W_n$ is the weighting function for that input (e.g. $W_1$ would be large if your decision is strongly motived to use public transport only if it is dry) and b is a bias or inherent preference number. By adding this bias parameter, b, to the function, inherent decision-making bias is accounted for. For example, the constant b would be large if you strongly believed in using public transport. The activation function, f(x), generally gives an output between 0 and 1 depending on the input values and by cascading these functions into several layers, a typical 'neural network' can be formed, similar to that shown in FIG. 13. The activation function shown here is in its most basic form, but the invention is not restricted by adherence to a function in this form or complexity.

Figure 13:
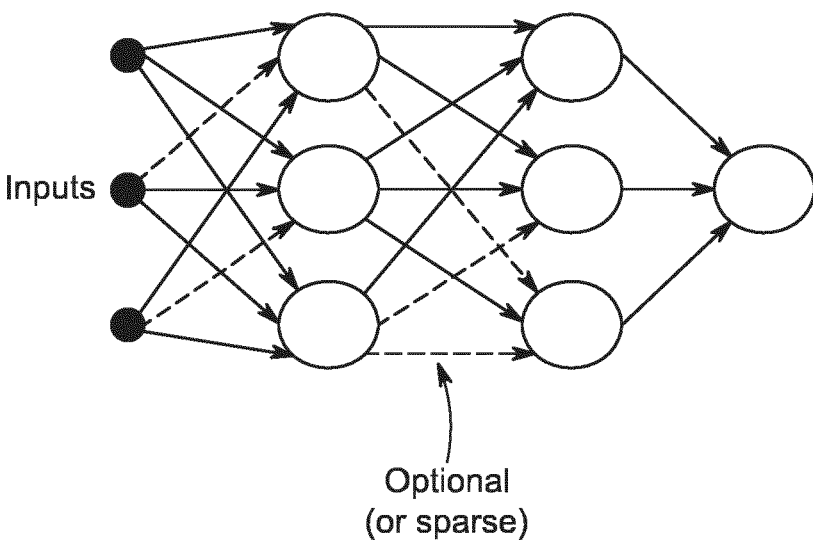
FIG. 13 shows an example of a neural network.

The weighting and bias values, $W_n$ and b, are not given a value by the user but are instead computed as the neural network 'learns' or is 'trained' during the machine learning process. This training is conducted by finding the difference between the output of the neural network and a known measured output. By adjusting the weighting and bias values (according to pre-defined rules) this difference can be minimised, and as further training measurements are completed, the weighting and bias values become such that the predicted output becomes increasingly accurate. FIG. 13 also indicates that by making the neural network sparse (where not every cell is connected to every other cell) the network can be simplified, meaning that when a cell is activated some others are not, and the computation time is reduced. Alternatively, when Convolutional Neural Networks are employed, all neurons are connected but different features are extracted or filtered from each layer as the network is trained, meaning than in essence the network behaves like a sparse network.

To further increase the computation speed, many micro decisions (or simple decisions) in the present disclosure are made by more computationally efficient analytic means and traditional machine learning approaches. Here, algebraic equations (or other forms of machine learning like 'decision tree', 'ensemble learning' or 'random forest') are formed and weighted according to the 'ground truth' data to give a correct output value. When these are combined with a library of pre-defined user cases and neural networks, the 'machine learned engines' are formed. For the 5D Perception Engine of the present disclosure a suitable artificial intelligence or machine learning engine (e.g. SRCGAN neural networks) are trained using data from hundreds of different training journeys, repeated in all types of weather and traffic conditions, using the outputs of the dynamic object model engine, the position calculator unit and the infrastructure model engine. It is well known that small objects or debris in the road can pose a detection challenge, particularly at high speeds, and this is one of the many scenarios that the artificial intelligence or machine learning engine is trained for. Other exemplary scenarios where a suitably trained artificial intelligence or machine learning engine can aid the correct classification of objects include:

Low detection road boundaries—some road boundaries, such as flat concrete walls, tend to 'reflect' detection signals away from the radar, unless the wall is perpendicular to the radar.

Safe to drive over debris—early identification of objects that are low and narrow enough to pass between the wheels, or can be safely driven over such as plastic bottles etc.

Cyclists, motorbikes and pedestrians—the consideration of situations where these road users are most vulnerable e.g., cyclists between lanes of traffic etc.

The training set for the artificial intelligence or machine learning engine can be expanded by using advanced simulators. In particular, since simulators can be configured to replicate many different road situations, the range of validity of the machine learning can be extended. Thus, subtle differences in road infrastructures and traffic management regulations from country to country can be taken into account.

Figure 14:
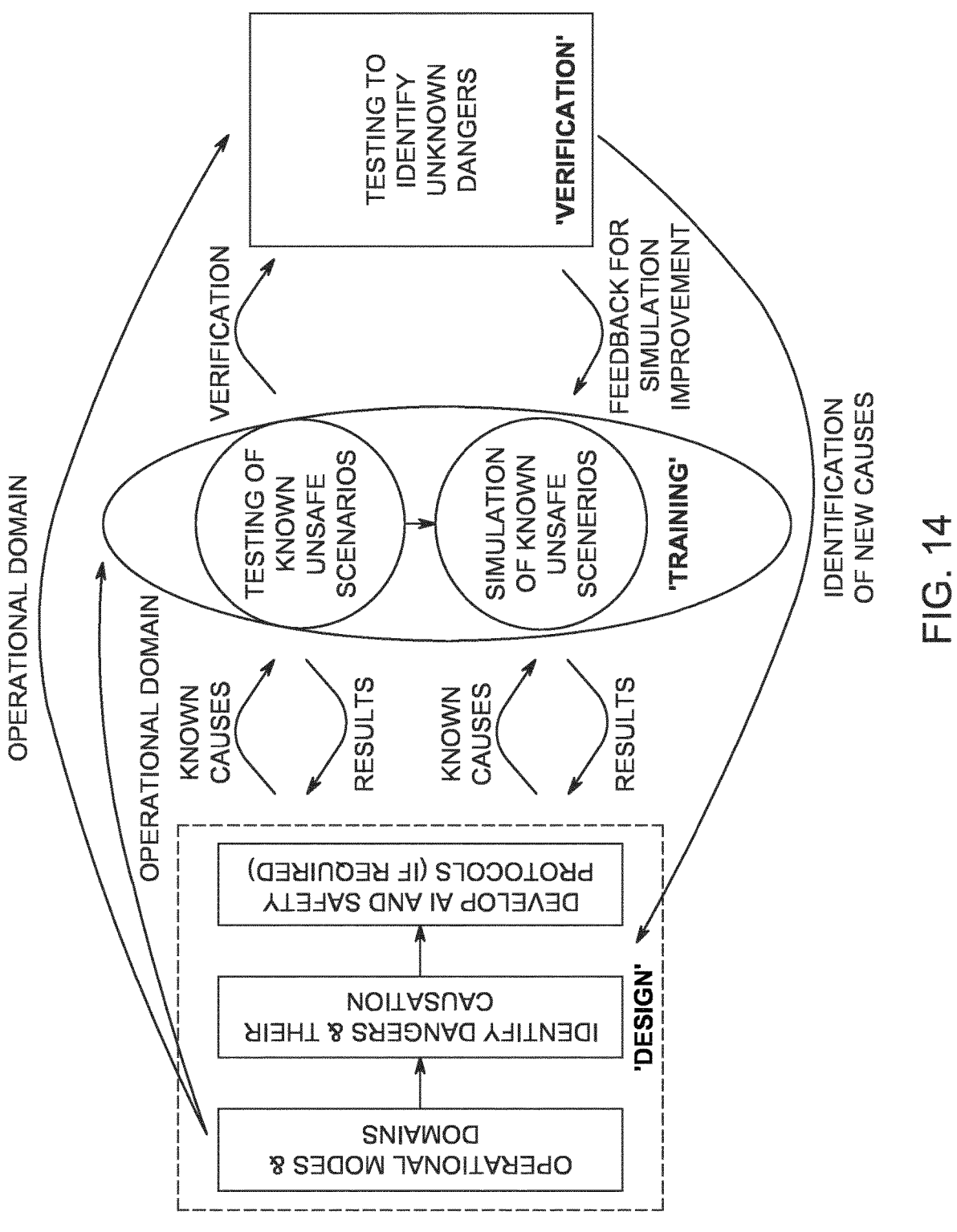
FIG. 14 shows the flowchart for training an artificial intelligence (AI) or machine learning system in accordance with the present disclosure.

FIG. 14 shows the flowchart which indicates how this training takes place. It begins by identifying the use-case for the APT system—e.g. identifying the type of vehicle (e.g. van, truck, car, etc) that the user's vehicle is. The most likely dangers to be encountered in this use case are then identified. The causes of these dangers are determined, and appropriate mitigation procedures may then be applied. These dangers are included in the previously described hundreds of different journeys, which were repeated over all types of weather and traffic conditions and were tested either physically or by simulation. For perception training, a change in velocity of the user's vehicle is monitored where it is obvious that if the approaching scene contains a perceived danger (by the driver) the user's vehicle will slow down. In essence, training has showed that in 'danger scenarios' there is a negative correlation to the perceived danger when compared to the rate of change of speed. Thus, if the danger has passed the vehicle tends to speed up quickly, or if a danger is approaching the vehicle tends to decelerate (and quickly if the perceived threat is large). These measurements are similarly used as the 'ground truth' data in the infrastructure model engine described earlier when the vehicle is at the same location. Furthermore, by using the results of the physical tests and comparing these to simulated ones, the simulator can be further validated and refined as required. The validity of this partially trained 5D Perception Engine of the present disclosure is verified by operating the APT Platform in unknown or undefined scenarios. If these tests indicate an incorrect operation due to the identification of an unrecognised cause of danger, these new test results are used to further train the neural networks. This process is repeated until the 5D Perception Engine is fully trained.

Through the approach discussed above, the inclusion of an artificial intelligence or machine learning engine, such as a neural network, in the full APT system of the present disclosure, the adaptability of the system is increased. In particular, by assessing how certain sensors perform better in some situations, these sensors can be given priority in these situations, while others in situations where they do not perform well can be ignored. This reduces the processing time and increases the available reaction time even further. By focusing on specific training journeys, an artificial intelligence or machine learning engine can be trained, as a priority, to avoid e.g. four main crash scenarios identified by the 2008 National Motor Vehicle Crash Causation Survey from the National Highway Traffic Safety Administration in the US, which found that:

17% of the vehicles were involved in rear-end crashes due to insufficient driver reaction time/foresight.

40% of the vehicles were turning or crossing at intersections due to insufficient driver vision.

20% of the vehicles ran off the edge of the road due to impaired vision by a combination of poor weather conditions, speed and driver inattention.

11% involve vehicles changing lanes due to driver blind spots.

By means of software updates, the 5D Engine can be improved as increased training data becomes available. Further, by giving all users the option to allow the 5D engine to record their journeys during use, further training data can be acquired, and a training database can be updated and expanded.

In use, the full APT Platform of the present disclosure is faster than prior art solutions through recognising safety critical scenarios as they are starting to develop and, in some cases, in advance of them developing, giving an early warning to drivers to be cautious, and enabling them to safely slow down without causing any undue risk.

While the above disclosure has been described in terms of automotive devices such as cars, vans, truck, and other user controlled or autonomous vehicles for transporting a user or cargo over a road network for the sake of brevity, those skilled in the art will recognise that the system can also be used for other user controlled or autonomous vehicles such as e.g.: trains, trams, and other vehicles for transporting a user or cargo over a rail network; boats; aeroplanes or other airborne vehicles for transporting a user or cargo such as drones.

The radar described herein is preferably designed for use in automotive radar safety systems (ADAS) where faster object detections result in a quicker reaction speed to prevent accidents.

The invention claimed is:

1. A vehicle safety sensor system comprising:
a processor;
a first radar sensor configuration to scan a first wide area;
a first auxiliary sensor configuration to scan a second wide area, wherein the first radar sensor and the first auxiliary sensor are configured to scan the first wide area and second wide area for detecting a moving object with respect to the vehicle, in conjunction with a sensor that measures travelling speed of the vehicle;
a second radar sensor configuration to scan a first narrow area containing the detected moving object, wherein the first narrow area is smaller than the first wide area; and
a second auxiliary sensor configuration to scan a second narrow area containing the detected moving object, wherein the second narrow area is smaller than the second wide area, wherein the second auxiliary sensor configuration comprises at least one sensor operating at a higher resolution than the sensors of the first auxiliary sensor configuration,

wherein data from the first radar sensor configuration and data from the first auxiliary sensor configuration is fused together to provide a first set of fused data;
wherein the system is configured to operate in a first mode when the processor does not detect an object from the first set of fused data,
wherein the system is configured to operate in a second mode when an object has been detected in the first mode,
wherein data from the second radar sensor configuration and data from second auxiliary sensor configuration is fused together to provide a second set of fused data,
wherein the processor is configured to monitor the detected objects based on the second set of fused data,
wherein the processor is further configured to determine a risk of collision with the detected moving object based on the second set of fused data, and
wherein determining the risk of collision comprises selecting a classification for the moving object from a plurality of classifications.

2. The system of claim 1, wherein:
the first auxiliary sensor configuration comprises an array of a plurality of optical sensors and the optical sensors detect visible spectrum electromagnetic radiation; and
the second auxiliary sensor configuration comprises an array of a plurality of optical sensors and the optical sensors detect visible spectrum electromagnetic radiation.

3. The system of claim 1 comprising a LIDAR sensor.

4. The system of claim 1, wherein the system is coupled to a global satellite navigation system antenna (GNSS).

5. The system of claim 4, wherein at least one sensor is coupled to a GNSS antenna and data provided by the at least one sensor comprises a timestamp derived from a received GNSS signal.

6. The system of claim 4, wherein the processor is coupled to a GNSS antenna and positional data in a GNSS signal received by the GNSS antenna is used to control at least one sensor.

7. The system of claim 1, wherein the processor is coupled to one or more environmental sensors, wherein environmental data provided by the one or more environmental sensors is used to determine a confidence weighting for at least one sensor, wherein the confidence weighting is indicative of the sensor's accuracy in a detected environmental condition.

8. The system of claim 7, wherein the environmental sensor is one or more of:
a light sensor or a precipitation sensor, and preferably wherein the processor is further coupled to one or more of: a compass, a wheel odometer, or a gyroscope.

9. The system of claim 1, wherein:
the second auxiliary sensor configuration comprises at least one sensor operating at a higher resolution than the sensors of the first auxiliary sensor configuration; and
the second auxiliary sensor configuration is configured to process a narrow area containing the detected moving object, wherein the narrow area scanned by the second auxiliary sensor configuration is smaller than the area scanned by the first auxiliary sensor configuration.

10. The system of claim 1, wherein the first radar configuration is a radar operating in a first mode and the second radar configuration is the radar operating in a second mode.

11. The system of claim 1, wherein the first auxiliary sensor configuration is an array of optical sensors operating in a first mode and the second auxiliary sensor configuration is the array of optical sensors operating in a second mode.

12. The system of claim 1, wherein selecting a classification comprises extracting the classification from a look up table using one or more of: a calculated size, shape, or colour of the moving object.

13. The system of claim 12, wherein selecting a classification comprises using a neural network.

14. The system of claim 12, wherein selecting a classification comprises using a random decision forest.

15. A method for improving safety of a vehicle comprising:

in a first mode:

scanning a first wide area with a first radar sensor configuration;

scanning a second wide area with a first auxiliary sensor configuration, wherein the first radar sensor and the first auxiliary sensor are configured to scan the first wide area and second wide area for detecting a moving object with respect to the vehicle, in conjunction with a sensor that measures travelling speed of the vehicle;

fusing data from the first radar sensor configuration with the data from the first auxiliary sensor configuration to provide a first set of fused data;

determining if an object is present based on the first set of data; and if it is determined than an object is present in the first mode, switching to a second mode; and in the second mode:

processing a first narrow area with a second radar sensor configuration, wherein the first narrow area is smaller than the first wide area;

processing a second narrow area with a second auxiliary sensor configuration, wherein the second narrow area is smaller than the second wide area, wherein the second auxiliary sensor configuration comprises at least one sensor operating at a higher resolution than the sensors of the first auxiliary sensor configuration;

fusing the data from the second radar sensor configuration and the data from second auxiliary sensor configuration to provide a second set of fused data; and monitoring the detected moving object from the second set of fused data;

wherein monitoring comprises:

determining a risk classification, where the risk classification is indicative of the risk of collision with the detected moving object.

16. The method of claim 15, wherein monitoring further comprises:

if the risk classification meets a predetermined criterion, switching to a third mode wherein a vehicle safety sensor system controls the vehicle to avoid the detected moving object.

17. A computer readable storage medium comprising instructions, which when executed by a processor coupled to a radar and an auxiliary sensor configuration, causes the processor to:

in a first mode:

scan a first wide area with a first radar sensor configuration;

scan a second wide area with a first auxiliary sensor configuration, wherein the first radar sensor and the first auxiliary sensor are configured to scan the first wide area and second wide area for detecting a moving object with respect to a vehicle, in conjunction with a sensor that measures travelling speed of the vehicle;

fuse data from the first radar sensor configuration with the data from the first auxiliary sensor configuration to provide a first set of fused data;

determine if an object is present based on the first set of data; and if it is determined than an object is present in the first mode, switching to a second mode; and in the second mode:

process a first narrow area with a second radar sensor configuration, wherein the first narrow area is smaller than the first wide area;

process a second narrow area with a second auxiliary sensor configuration, wherein the second narrow area is smaller than the second wide area, wherein the second auxiliary sensor configuration comprises at least one sensor operating at a higher resolution than the sensors of the first auxiliary sensor configuration;

fuse the data from the second radar sensor configuration and the data from second auxiliary sensor configuration to provide a second set of fused data; and monitor the detected moving object from the second set of fused data;

wherein monitoring the detected moving object comprises:

determine a risk classification, where the risk classification is indicative of the risk of collision with the detected moving object.

18. The computer readable storage medium of claim 17, wherein the instructions further cause the processor to monitor the detected moving object further by switching to a third mode wherein a vehicle safety sensor system controls the vehicle to avoid the detected moving object if the risk classification meets a predetermined criterion.

* * * * *